United States Patent [19]
Allen et al.

[11] Patent Number: 6,111,520
[45] Date of Patent: Aug. 29, 2000

[54] SYSTEM AND METHOD FOR THE WIRELESS SENSING OF PHYSICAL PROPERTIES

[75] Inventors: Mark G. Allen, Atlanta; Jennifer M. English, Kennesaw, both of Ga.

[73] Assignee: Georgia Tech Research Corp., Atlanta, Ga.

[21] Appl. No.: 09/054,011

[22] Filed: Apr. 2, 1998

Related U.S. Application Data

[60] Provisional application No. 60/044,670, Apr. 18, 1997.

[51] Int. Cl.[7] ................................................. G08B 21/00
[52] U.S. Cl. ............................... 340/870.16; 340/870.17; 340/870.31; 340/447; 340/825.54; 340/442; 340/449; 340/451; 340/584; 340/665; 340/521; 340/531; 374/120; 374/183; 374/184; 422/82.02; 331/66; 324/655
[58] Field of Search .......................... 340/825.54, 870.11, 340/870.16, 870.17, 870.28, 447, 870.31, 870.32, 870.37, 870.38, 879.4, 690, 572, 448, 442, 449, 451, 584, 665, 521, 531; 374/120, 154, 163, 183, 184; 422/82.02; 331/66, 141; 724/655

[56] References Cited

U.S. PATENT DOCUMENTS

| | | | |
|---|---|---|---|
| 3,338,100 | 8/1967 | Takami | 374/154 |
| 4,127,110 | 11/1978 | Bullara | 600/561 |
| 4,237,900 | 12/1980 | Schulman et al. | 600/301 |
| 4,494,411 | 1/1985 | Koschke et al. | 73/724 |
| 4,764,244 | 8/1988 | Chitty et al. | 216/20 |
| 4,991,283 | 2/1991 | Johnson et al. | 29/595 |
| 5,260,683 | 11/1993 | Tanaka et al. | 340/448 |
| 5,312,674 | 5/1994 | Haertling et al. | 428/210 |
| 5,514,337 | 5/1996 | Groger et al. | 422/82.08 |
| 5,514,832 | 5/1996 | Dusablon, Sr. et al. | 174/15.1 |
| 5,544,399 | 8/1996 | Bishop et al. | 92/25.41 |
| 5,610,340 | 3/1997 | Carr et al. | 73/718 |
| 5,731,754 | 3/1998 | Lee, Jr. et al. | 340/447 |

*Primary Examiner*—Benjamin C. Lee
*Attorney, Agent, or Firm*—Thomas, Kayden, Horstemeyer & Risley, L.L.P.

[57] ABSTRACT

Several sensors are provided for determining one of a number of physical properties including pressure, temperature, and other physical conditions. In general, the sensors feature a resonant circuit with an inductor coil which is electromagnetically coupled to a transmitting antenna. When an excitation signal is applied to the antenna, a current is induced in the sensor circuit. This current oscillates at the resonant frequency of the sensor circuit. The resonant frequency and bandwidth of the sensor circuit is determined using an impedance analyzer, a transmitting and receiving antenna system, or a chirp interrogation system. The resonant frequency may further be determined using a simple analog circuit with a transmitter. The sensors are constructed so that either the resonant frequency or bandwidth of the sensor circuit, or both, are made to depend upon the physical properties such as pressure, temperature, presence of a chemical species, or other condition of a specific environment. The physical properties are calculated from the resonant frequency and bandwidth determined.

19 Claims, 21 Drawing Sheets

SYSTEM AND METHOD FOR THE WIRELESS SENSING OF PHYSICAL PROPERTIES

CROSS REFERENCE TO RELATED APPLICATIONS

This application claims priority to and the benefit of the filing date of co-pending United States provisional patent application entitled, "A New Micro-machining Approach Based on Ceramic Packaging Technology and Wireless Communications," filed on Apr. 18, 1997, accorded Ser. No. 60/044,670, and incorporated herein by reference.

FIELD OF THE INVENTION

This invention relates to the field of physical sensors, and, more particularly, to sensors for wirelessly sensing pressure, temperature and other physical properties in a specific environment.

BACKGROUND OF THE INVENTION

Sensing technology is currently employed in a number of different environments. Specifically, sensors employed to determine the pressure or temperature of a medium are used in a wide variety of applications. Most such applications involve the use of temperature and pressure sensors in environments of low temperature or in environments of high temperature which require adequate cooling measures or the use of high temperature materials in the construction of such sensors. In such applications, for example, micro-machining techniques exist by which pressure sensors are constructed using silicon as a substrate.

An example of a micromachined silicon pressure sensor design is a capacitive pressure sensor. This sensor uses a parallel plate capacitor and a flexible silicon diaphragm. Two silicon wafers are bulk machined to create cavities in the silicon. One silicon wafer is bulk micromachined to create a deep cavity and subsequently a thin membrane. Metal layers are deposited onto appropriate boundaries of the cavities creating the conductors of the parallel plate capacitor. The wafers are bonded so that the metal conductors are facing each other and a capacitor is formed. The capacitor is electrically connected to a silicon circuit on the substrate which in turn is connected to external electronic devices via wire leads. As pressure of the medium in which the sensor is placed increases, the diaphragm deflects and the distance between the plates of the capacitor decreases, causing an increase in the capacitance. The change in capacitance is read by the silicon circuit, and a resultant voltage is output via the wire leads.

Micromachined sensors such as the example given above suffer problems when exposed to certain environmental conditions. In high temperature applications, the silicon sensor and similar sensors do not operate reliably or cease to function completely due to the heat. For example, silicon begins to plastically deform at approximately 800° C. and melts at approximately 1400° C. The pressure readout due to the deflection of the flexible silicon diaphragm is compromised by the plastic deformation of silicon causing permanent measurement error. Many other sensor materials have even lower melting points which will limit the operating temperature of the environment. In addition, different environments may include corrosive elements in which silicon or other similar materials may not survive.

Another problem with micromachined silicon sensors and similar sensor technology is that circuitry, electrical connections, and wire leads through which temperature, pressure, or other physical information is obtained can not withstand high temperature applications or corrosive environments. For example, silicon circuitry does not function at temperatures greater than 300° C. and high temperature solders, conductive adhesives, and wiring schemes are difficult to implement.

In addition, in the case where a temperature, pressure, or other physical reading of an environment is measured from a sensor mounted to a mobile structure such as a turbine blade or other moveable apparatus, chamber or vessel, the wire leads connected to traditional sensors may interfere with the operation of the particular mobile structure. Such would also be the case of mobile vessels in which interior pressure sensing is desired.

Consequently, there is a need for pressure and temperature sensing technology which overcomes the problems experienced by traditional sensors as described above.

SUMMARY OF THE INVENTION

In accordance with a first embodiment of the present invention, there is provided a sensor for determining the pressure of a specific environment. The pressure sensor features an inductive-capacitive (LC) resonant circuit with a variable capacitor. The capacitance varies with the pressure of the environment in which the capacitor is placed. Consequently, the resonant frequency of the LC circuit of the of the pressure sensor varies depending on the pressure of the environment. The pressure sensor is made of completely passive components having no active circuitry or power sources such as batteries. The pressure sensor is completely self-contained having no leads to connect to an external circuit or power source.

In accordance with a second embodiment of the present invention, there is provided a sensor for determining the temperature of a specific environment. The temperature sensor features an inductive-capacitive (LC) resonant circuit with a variable capacitor. The capacitance varies with the temperature of the environment in which the capacitor is placed, the capacitor having a dielectric with a permittivity that varies with varying temperature. Consequently, the resonant frequency of the LC circuit of the pressure sensor varies depending on the temperature of the environment. The temperature sensor is made of completely passive components having no active circuitry or power sources such as batteries. Also, the temperature sensor is completely self-contained having no leads to connect to an external circuit or power source.

In accordance with a third embodiment of the present invention, there is provided a combination pressure and temperature sensor for determining both the pressure and temperature a specific environment. The combination sensor features a first inductive-capacitive (LC) resonant circuit similar to that of the first embodiment, and a second LC circuit similar to that of the second embodiment. The temperature sensing portion of the combination sensor provides an independent source of temperature information which may be employed in real time calibration of the pressure sensor. The combination sensor is also constructed of completely passive components having no active circuitry or power sources such as batteries. Also, the combination sensor is completely self-contained having no leads to connect to an external circuit or power source.

In accordance with a fourth embodiment of the present invention, there is provided a sensor having a resistance which is variable with a specific property or physical condition of a specific environment. The variable resistance sensor features a resistive-inductive-capacitive (RLC) resonant circuit with a variable resistance. The resistance may vary with the temperature, chemical makeup of the environment, or other physical condition of the environment to which the variable resistance is exposed. Consequently, the bandwidth of the RLC circuit of the of the variable resistance sensor varies depending on the value of the variable resistance which depends on a specific physical condition of the environment. The variable resistance sensor is made of completely passive components having no active circuitry or power sources such as batteries and is completely self-contained having no leads to an external circuit or power source.

In accordance with a fifth embodiment of the present invention, there is provided a variable resistance and pressure sensor which is a combination of the first and fourth embodiments. In the fifth embodiment, the inclusion of a variable resistance in the LC circuit of the first embodiment allows the determination of both the pressure from the resonant frequency of the resulting RLC circuit due to the variable capacitance, and the temperature or other physical condition from the bandwidth of the RLC circuit due to the variable resistance.

The sensors of the present invention are used in conjunction with several different excitation systems, resulting in a system and method for determining the pressure, temperature, or other physical condition. Accordingly, each of the above described sensors is electromagnetically coupled to a transmitting antenna. Consequently, a current is induced in each of the sensors which oscillates at the resonant frequency of the sensor in question. This oscillation causes a change in the frequency spectrum of the transmitted signal. From this change, the bandwidth and resonant frequency of the particular sensor may be determined, from which the corresponding physical parameters are calculated.

Accordingly, the present invention provides for an impedance system and method of determining the resonant frequency and bandwidth of a resonant circuit within a particular sensor. The system includes a transmitting antenna which is coupled to an impedance analyzer. The impedance analyzer applies a constant voltage signal to the transmitting antenna scanning the frequency across a predetermined spectrum. The current passing through the transmitting antenna experiences a peak at the resonant frequency of the sensor. The resonant frequency and bandwidth are thus determined from this peak in the current.

The method of determining the resonant frequency and bandwidth using an impedance approach may include the steps of transmitting an excitation signal using a transmitting antenna and electromagnetically coupling a sensor having a resonant circuit to the transmitting antenna thereby modifying the impedance of the transmitting antenna. Next, the step of measuring the change in impedance of the transmitting antenna is performed, and finally, the resonant frequency and bandwidth of the sensor circuit are determined.

In addition, the present invention provides for a transmit and receive system and method for determining the resonant frequency and bandwidth of a resonant circuit within a particular sensor. According to this method, an excitation signal of white noise or predetermined multiple frequencies is transmitted from a transmitting antenna, the sensor being electromagnetically coupled to the transmitting antenna. A current is induced in the resonant circuit of the sensor as it absorbs energy from the transmitted excitation signal, the current oscillating at the resonant frequency of the resonant circuit. A receiving antenna, also electromagnetically coupled to the transmitting antenna, receives the excitation signal minus the energy which was absorbed by the sensor. Thus, the power of the received signal experiences a dip or notch at the resonant frequency of the sensor. The resonant frequency and bandwidth are determined from this notch in the power.

The transmit and receive method of determining the resonant frequency and bandwidth of a sensor circuit includes the steps of transmitting a multiple frequency signal from transmitting antenna, and, electromagnetically coupling a resonant circuit on a sensor to the transmitting antenna thereby inducing a current in the sensor circuit. Next, the step of receiving a modified transmitted signal due to the induction of current in the sensor circuit is performed. Finally, the step of determining the resonant frequency and bandwidth from the received signal is executed.

Yet another system and method for determining the resonant frequency and bandwidth of a resonant circuit within a particular sensor includes a chirp interrogation system. This system provides for a transmitting antenna which is electromagnetically coupled to the resonant circuit of the sensor. An excitation signal of white noise or predetermined multiple frequencies is applied to the transmitting antenna for a predetermined period of time, thereby inducing a current in the resonant circuit of the sensor at the resonant frequency. The system then listens for a return signal which radiates from the sensor. The resonant frequency and bandwidth of the resonant circuit are determined from the return signal.

The chirp interrogation method for determining the resonant frequency and bandwidth of a resonant circuit within a particular sensor includes the steps of transmitting a multi-frequency signal pulse from a transmitting antenna, electromagnetically coupling a resonant circuit on a sensor to the transmitting antenna thereby inducing a current in the sensor circuit, listening for and receiving a return signal radiated from the sensor circuit, and determining the resonant frequency and bandwidth from the return signal.

Finally, the present invention provides an analog system and method for determining the resonant frequency of a resonant circuit within a particular sensor. The analog system comprises a transmitting antenna coupled as part of a tank circuit which in turn is coupled to an oscillator. A signal is generated which oscillates at a frequency determined by the electrical characteristics of the tank circuit. The frequency of this signal is further modified by the electromagnetic coupling of the resonant circuit of a sensor. This signal is applied to a frequency discriminator which in turn provides a signal from which the resonant frequency of the sensor circuit is determined.

The analog method for determining the resonant frequency and bandwidth of a resonant circuit within a particular sensor includes the steps of generating a transmission signal using a tank circuit which includes a transmitting antenna, modifying the frequency of the transmission signal by electromagnetically coupling the resonant circuit of a sensor to the transmitting antenna, and converting the modified transmission signal into a standard signal for further application.

According to the present invention, multiple sensors may be employed at a single time to provide redundancy and more accurate information, or to measure several physical conditions simultaneously. Also, the spatial resolution of physical characteristics may be obtained. Such multiple sensors may either be discretely placed in the system to be sensed, or may all be formed on or in a single substrate according to batch fabrication techniques and placed in the system or environment to be sensed.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENT

LC Pressure Sensor

Figure 1:
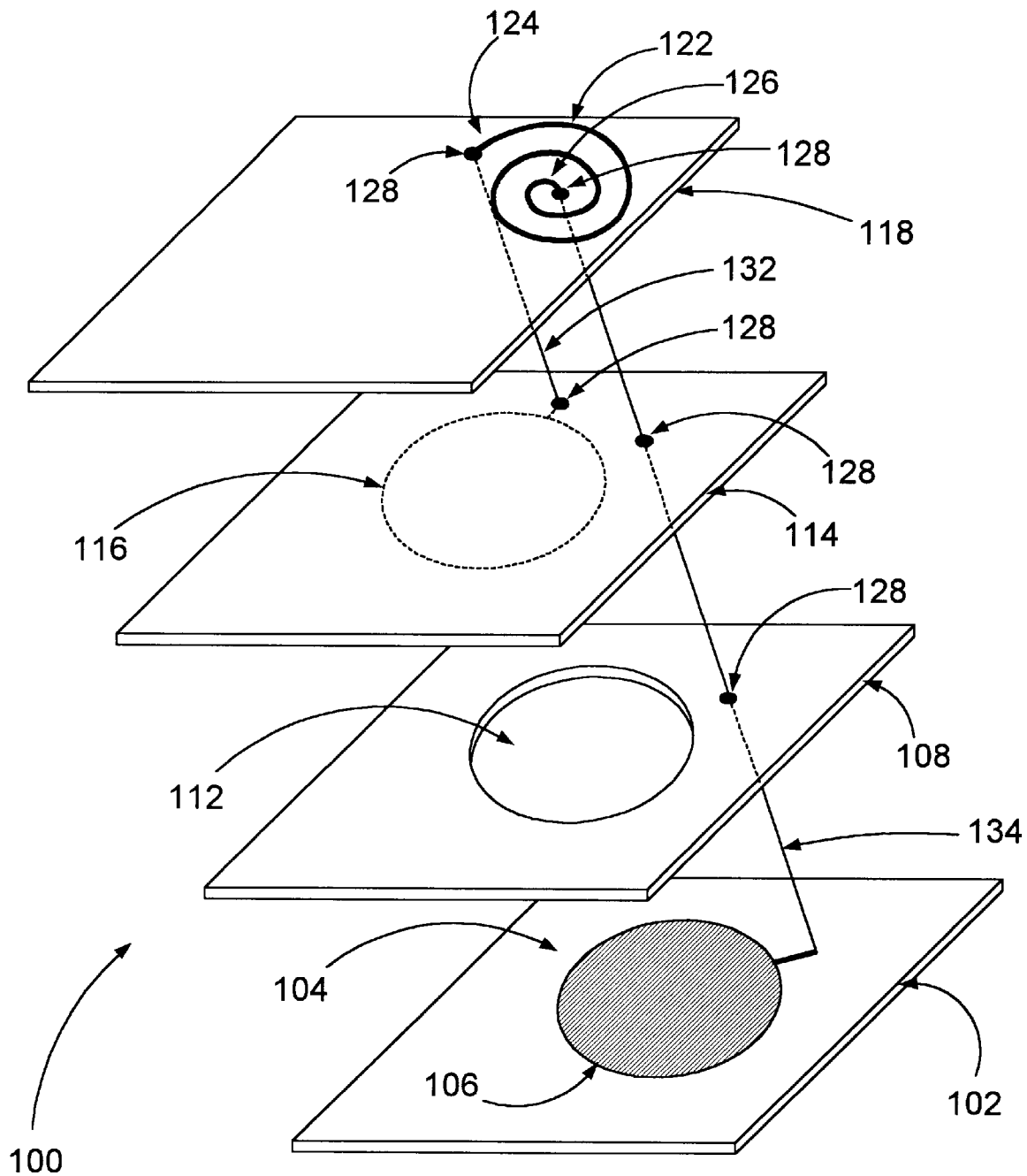
FIG. 1 is an assembly view of a pressure sensor according to a first embodiment of the present invention.

Turning to FIG. 1, shown is an assembly view of a pressure sensor 100 according to a first embodiment of the present invention. The pressure sensor 100 is constructed using a first layer 102 with a central portion that acts as a flexible membrane 104. The central portion that acts as the flexible membrane 104 is essentially the first layer 102 itself unchanged, and not a distinct surface area in the preferred embodiment, but it is not restricted to this structure. A metal pattern which defines a bottom conductor 106 is disposed on the top of the first layer 102 lying over the flexible membrane 104 using any suitable micromachining technique(s). A second layer 108 overlies the first layer 102. A hole 112 is formed through the second layer 108 which mates with the bottom conductor 106. Although a single second layer 108 is shown, several second layers may be placed in alignment with each other in the place of the single second layer 108. A third layer 114 overlies the second layer 108. Disposed on the underside of the third layer 114 is a metal pattern which defines a second conductor 116. The first and second conductors 106 and 116 are generally the same size and shape as the hole 112 in the second layer 108.

Finally, a fourth layer 118 overlies the third layer 114. Disposed on top of the fourth layer 118 is an inductor coil 122 with an outer end 124 and an inner end 126. In order to provide for an electrical contact between the outer end 124 and the second conductor 116, and the inner end 126 and the bottom conductor 106, small vias 128 are cut through the second, third, and fourth layers 102, 108, 114, 118 where appropriate. The small vias 128 are punched in the layers concurrently with the holes 112. When assembled, the first, second, third, and fourth layers 102, 108, 114, 118 are aligned as shown and a metal paste is forced into the small vias 128 to create the first and second electrical connections 132 and 134. In the preferred embodiment, the first, second, third, and fourth layers 102, 108, 114, 118 are formed from ceramic tape, which is commonly used in microelectronics packaging and which is generally created from alumina and glass particles suspended in an organic binder. After alignmnent and via filling, the layers 102, 108, 114, 118 are laminated together in a hot vacuum press at 70° C. and a pressure of about 3000 psi with a vacuum level of 28" of Hg. The laminated structure is cured in a furnace at about 850° C. for one hour.

Although the material used to create the layers 102, 108, 114, 118 is ceramic tape in the preferred embodiment, many other materials may just as easily be used including silicon (Si), silicon carbide (SiC), ceramic pastes, alumina substrates, ceramic inks, polycrystalline diamond films, electroplated metals, quartz ($SiO_2$), and polymer thin films as well as other materials known by those skilled in the art. Likewise, materials that may be used to construct the inductor coil 122, first and second conductors 106 and 116, and electrical connections 132 and 134 include gold (Au), copper (Cu), aluminum (Al), tungsten (W), silver (Ag), palladium (Pd), platinum (Pt), chromium (Cr), molybdenum (Mo), and most possible alloys of these metals as well as other materials known by those skilled in the art. The actual materials chosen to construct the sensor ultimately depends on the particular application for the sensor in question.

Additionally, although lamination is used in the preferred embodiment, other surface and bulk micromachining techniques known in the art can be employed to form these structores.

Figure 2:
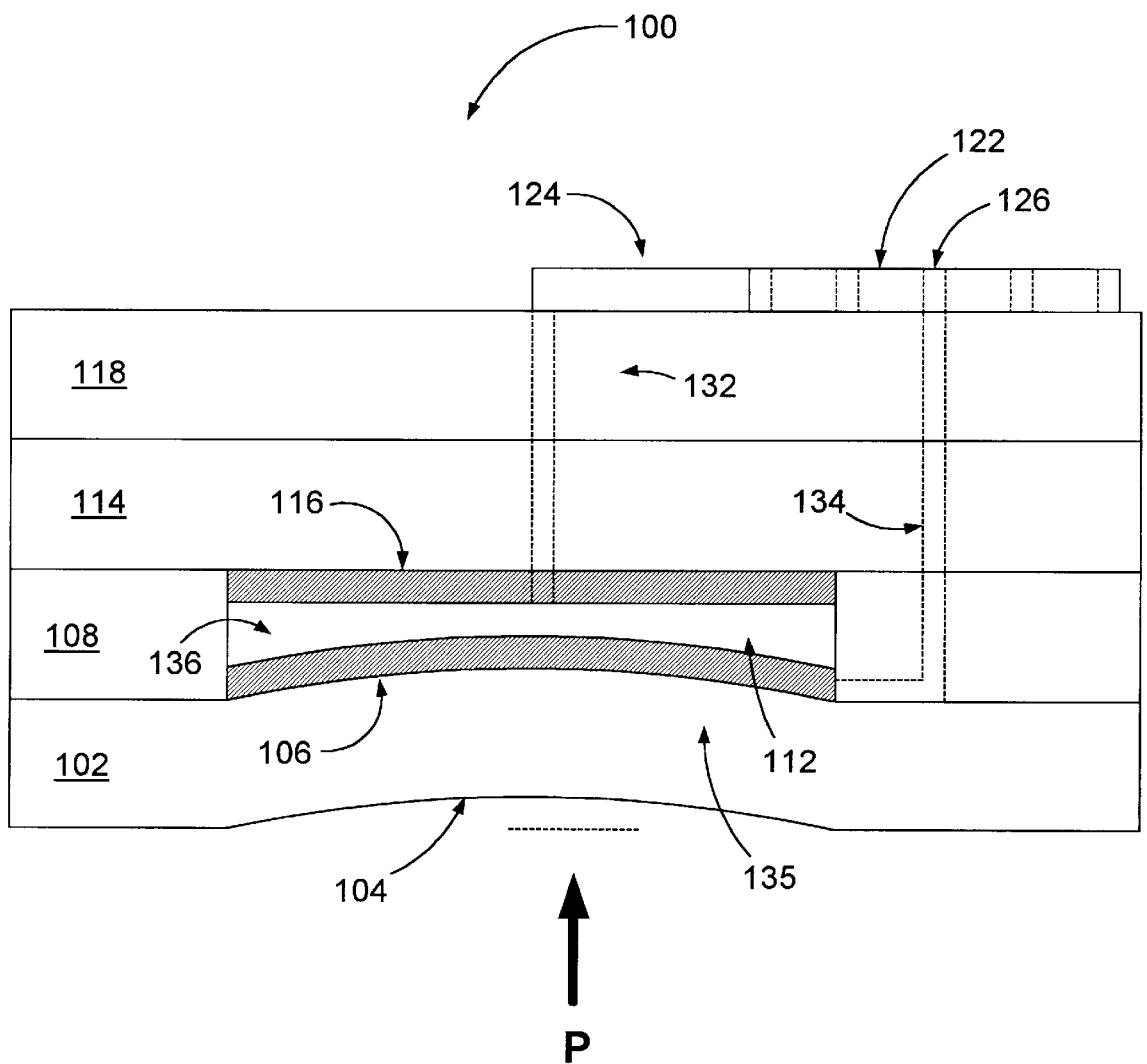
FIG. 2 is a cross-sectional view of the pressure sensor of FIG. 1.

Referring next to FIG. 2, shown is a cross-sectional view of the pressure sensor 100 after curing. Once fully formed, the first and second conductors 106 and 116 together form a capacitor 135. The flexible membrane 104 is deflected by the force of pressure P as shown. Note that the degree of flexibility in the flexible membrane 104 may be altered by adding additional layers onto the end layers 102 and 128 to add rigidity. The gap 136 between the first and second conductors 106 and 116 is variable across the surface area due to the curved nature of the deflection of the flexible membrane 104. Consequently, the capacitance C of the capacitor 135 can only be approximated by $$C = \frac{\varepsilon_0 \varepsilon_r A}{d},$$

where $\varepsilon_0$ is the permittivity of free space, $\varepsilon_r$ is the relative permittivity of the material between the conductors 106 and 116, and A is the surface area of the first and second conductors 106 and 116, because the above formula is used to calculate the capacitance C of two parallel plates with constant surface area and uniform distance d. It is possible to calculate the capacitance C in the case of a spherical or bubbled flexible membrane as known in the art, or the sensor may simply be calibrated.

The pressure load causes the flexible membrane 104 to deflect, the first and second conductors 106 and 116 move closer together and the gap 136 decreases. As the gap 136 decreases, the capacitance C increases as is known by those skilled in the art. Thus the capacitance C of the pressure sensor 100 is variable with the pressure P of the environment in which the pressure sensor 100 is placed.

The first conductor 106 is electrically connected to the inner end 126 of the inductor coil 122 and the second conductor 116 is electrically connected to the outer end 124 of the inductor coil 122 through the electrical connectors 132 and 134. Thus, neglecting parasitic resistances of the conductor lines, a resonant inductive-capacitive (LC) circuit is formed. The resonant frequency $\omega_0$ of the resonant circuit is found in the $$\omega_0 = \frac{1}{\sqrt{L \cdot C(P)}}$$

where L is the inductance of the inductor coil 122 and C(P) is the capacitance of the capacitor formed by the first and second conductors 106 and 116 which varies with pressure P. As the pressure P increases and the flexible membrane 104 deflects, the distance d decreases causing the capacitance C to increase, and consequently, the resonant frequency decreases. Thus, the resonant frequency of the pressure sensor 100 changes with a corresponding change in pressure P.

The pressure sensor 100 is designed to allow a current to be induced in the inductor coil 122 when the pressure sensor 100 is placed in a time varying electromagnetic field generated from an external excitation signal. Thus, when placed in a time-varying electromagnetic field, the inductor coil 122 is electromagnetically coupled to the source of the electromagnetic field, presumably, but not limited to, a transmitting antenna. If the electromagnetic field is comprised at least in part of frequencies at or near the resonant frequency of the pressure sensor 100, then a current is induced in the inductor coil 122 which oscillates at the resonant frequency of the resonant circuit. In this manner, the resonant circuit is "excited" by a transmitted signal. There are several ways to excite the current in the resonant circuit. By doing so, the impedance of the transmitting antenna is altered. This condition may be detected, and ultimately, the resonant frequency of the pressure sensor may be ascertained and the pressure calculated as will be discussed later.

It is a distinct advantage that the pressure sensor 100 is comprised of completely passive components. There are no wire leads or power sources such as batteries employed as the sensor is designed to be electromagnetically coupled to a transmitter. Also, the preferred embodiment above has the additional advantage that it is constructed using existing materials and manufacturing infrastructure. Specifically, sensors may be manufactured using batch fabrication techniques and other micromachining techniques that are known to those skilled in the art.

Figure 3:
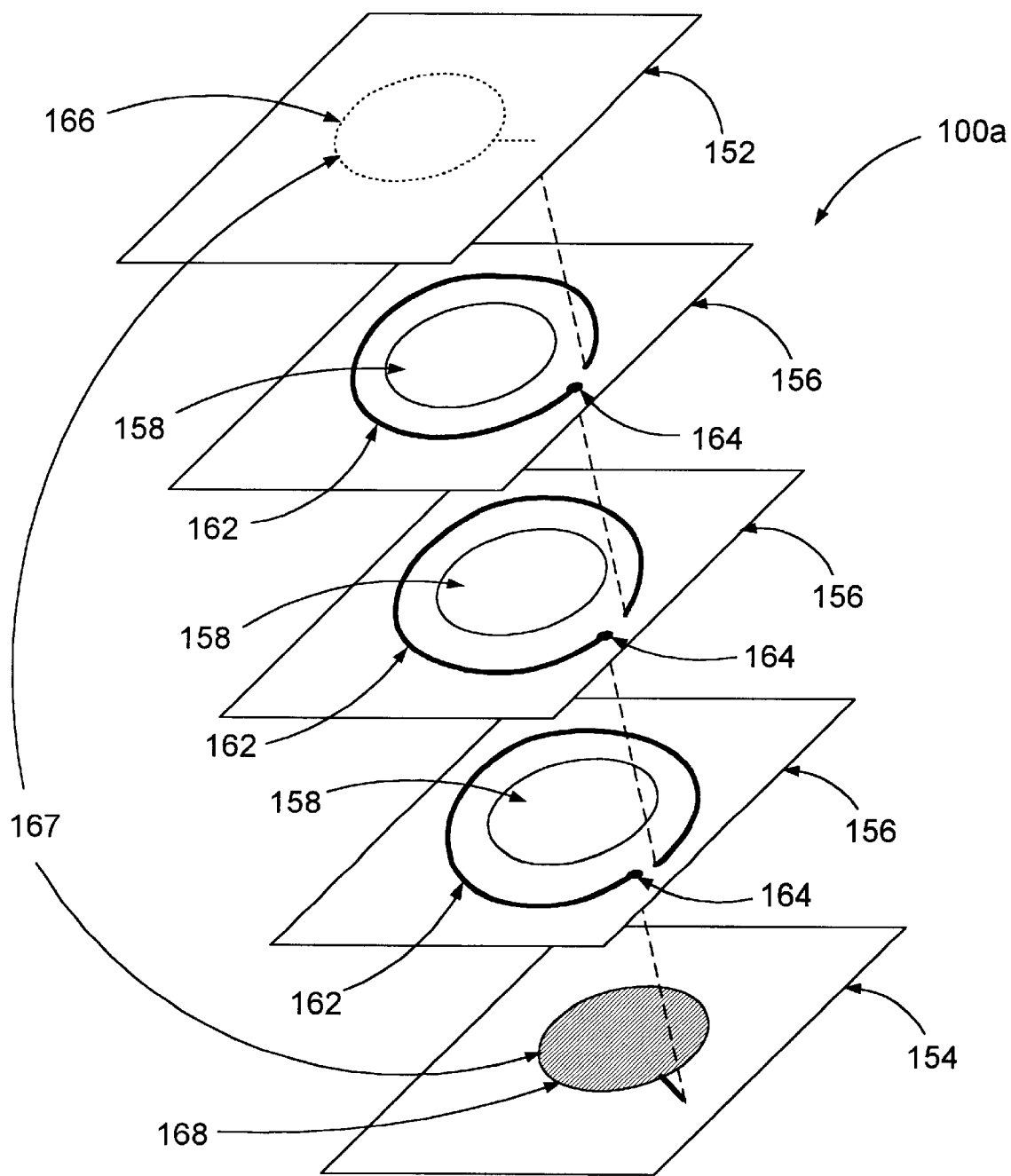
FIG. 3 is an assembly view of an alternative pressure sensor according to the first embodiment of the present invention.

Turning to FIG. 3, shown is an assembly view of an alternative pressure sensor 100a according to the first embodiment of the present invention. In fact, it is possible that there are many different configurations by which a pressure sensor 100 may be constructed using existing micromachining techniques. The alternative pressure sensor 100a serves as a further example. The pressure sensor 100a features a first layer 152 and a second end layer 154. Disposed between the first and second end layers 152 and 154 are inner layers 156. In the middle of each inner layer 156 is a large bole 158. Also, a single winding 162 constructed from a conductor material is patterned on the inner layers 156 around the large hole 158. At the end of each winding 162, a small via 164 is cut through each inner layer 156.

The first end layer 152 is patterned with metal to create a first conductor 166 of a parallel plate capacitor 167. The second end layer 154 is patterned with a second conductor 168 of the capacitor 167. Note the second end layer 154 may actually comprise several layers together to add rigidity if desired. The first and second conductors 166 and 168 are the slightly smaller in diameter than the large holes 158 in the inner layers 156. Upon final construction of the pressure sensor 100a, the first end layer 152, inner layers 156, and the second end layer 154 are aligned together. The windings 162 mate with each other and with the first and second conductors 166 and 168 through the small vias 164 by the injection of a metallic paste in similar manner as the pressure sensor 100 (FIG. 1). As was the case with the pressure sensor 100, the aligned first and second end layers 152 and 154, and the inner layers 156 are laminated in a hot vacuum press and cured in a furnace. Together the windings 162 form an inductor coil which functions in the same manner as the inductor coil 122 (FIG. 1) of the pressure sensor 100.

It is additionally noted that additional layers may be placed over any exposed conductive material if a pressure sensor 100 is sought with no exposed conductors. For that matter, a window may be punched through such additional layers to expose an desired conductor.

Figure 4:
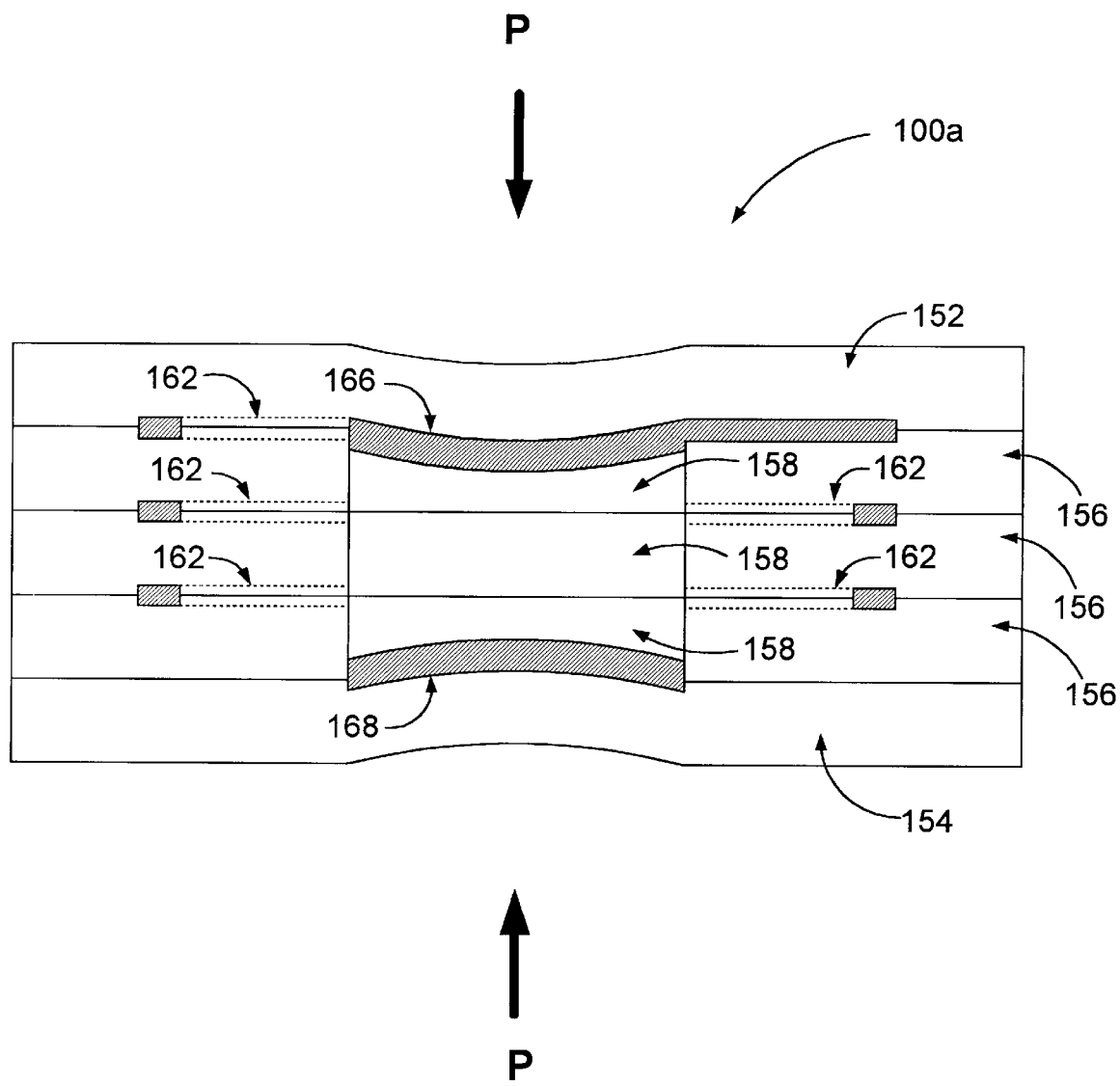
FIG. 4 is a cross-sectional view of the pressure sensor of FIG. 3.

Turning then to FIG. 4, shown is a sectional view of the pressure sensor 100a fully assembled. Similar to the pressure sensor 100 (FIG. 2), the pressure P causes the deflection of the first and second end layers 152 and 154. Note that the extent of this deflection may be controlled by creating the first and second end layers 152 and 154 using thicker layer material, or alternatively, several end layers together with the first and second conductors 166 and 168 disposed on the inner most layer. The operation of the pressure sensor 100a is similar to that of the pressure sensor 100 and is not discussed in detail herein. Also, the small vias 164 (FIG. 3) cut through the inner layers 156 are not shown. Additionally, the pressure sensor 100a is preferably constructed from ceramic tape as was the case with the pressure sensor 100, however, all the materials that may be used in the construction of the pressure sensor 100 may be used to construct the pressure sensor 100a.

LC Temperature Sensor

Figure 5:
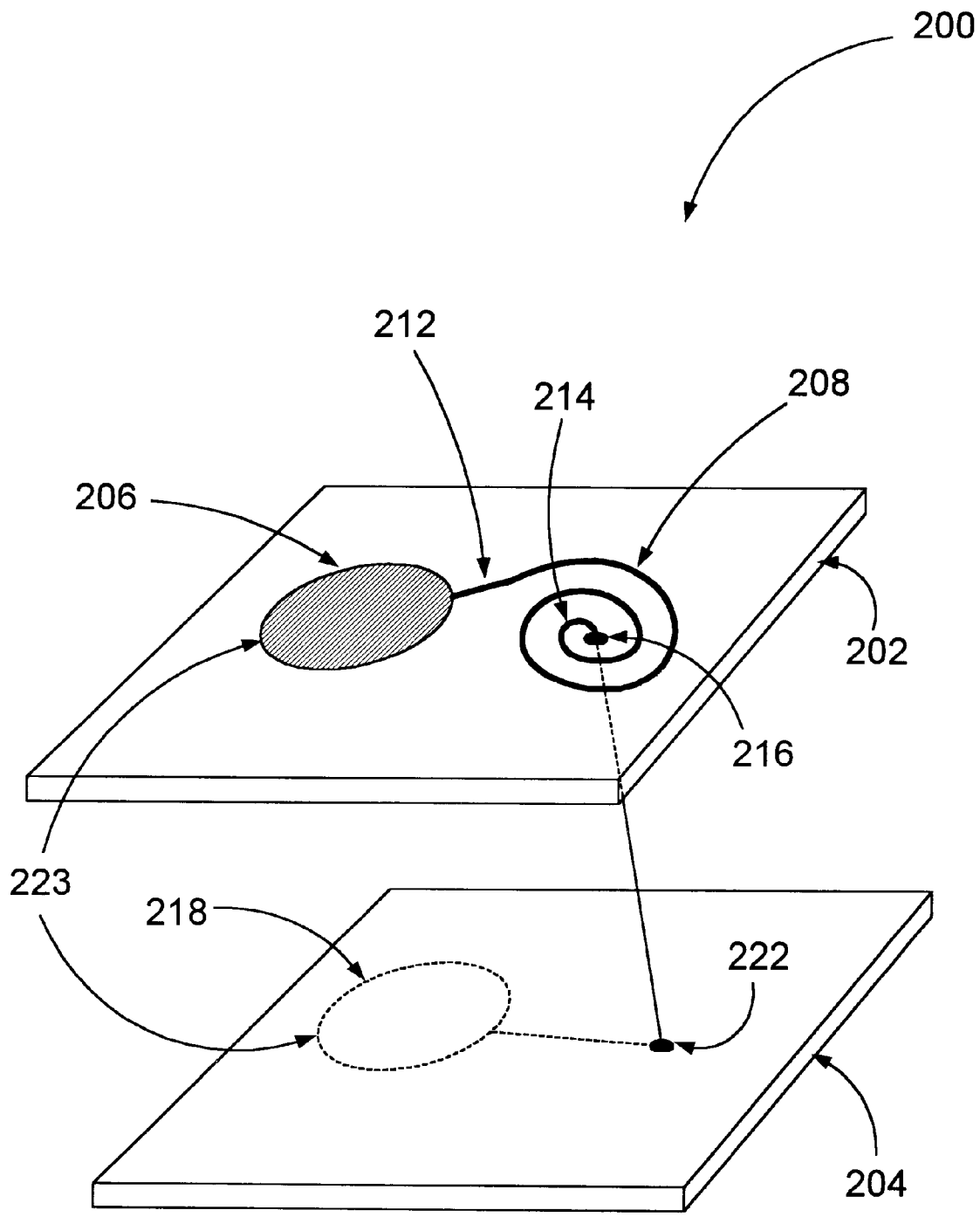
FIG. 5 is an assembly view of a temperature sensor according to a second embodiment of the present invention.

Turning next to FIG. 5, shown is an assembly view of a temperature sensor 200 according to a second embodiment of the present invention. The temperature sensor 200 features a first layer 202 and a second layer 204. Disposed, for example, by means of a printing process on the first layer 202 is a first conductor 206 of a parallel plate capacitor and an inductor coil 208. The inductor coil 208 has an outer end 212 which is attached to the first conductor 206. An inner end 214 of the inductor coil 208 terminates at a first small via 216 cut through the first layer 202.

Disposed on the second layer 204 is a second conductor 218 of the parallel plate capacitor. A small via 222 is cut through the second layer 204 which aligns with the first small via when the first layer 202 is aligned with the second layer 204. The outer end 212 of the inductor coil 208 is electrically connected to the second conductor 218 by injecting a metal paste into the first and second vias 216 and 222 when the temperature sensor 200 is assembled. The assembled temperature sensor 200 is laminated in a hot vacuum press and cured in a furnace.

In the case of the temperature sensor 200, the first and second layers 202 and 204 act as a dielectric in a capacitor 223 formed by the first and second conductors 206 and 218. As was the case with the pressure sensor 100 (FIG. 1), the inductor coil 208 coupled to the capacitor 223 defines an LC resonant circuit. A current is excited in this resonant circuit in the same manner as the resonant circuit of the pressure sensor 100. However, the permittivity of the dielectric which comprises the first and second layers 202 and 204 changes with temperature. Thus, the capacitance C of the capacitor 223 varies with a change in temperature as defined by $$C = \frac{\varepsilon(T)A}{d}$$

where $\varepsilon(T)$ is the permittivity of the dielectric as a function of temperature, A is the area of the first and second conductors 206 and 218, and d is the distance between the first and second conductors 206 and 218. Note, however, that the area A and the distance d will also slightly change due to thermal expansion effects resulting in a change in capacitance C These changes in capacitance C, along with the permittivity induced capacitive changes are all taken into account during calibration of the sensor. Thus, the resonant frequency of the resonant circuit of the temperature sensor 200 depends on the temperature of the environment in which the temperature sensor 200 is placed. Suitable calibration of the temperature sensor 200 will provide the resonant frequency as a function of temperature.

Figure 6:
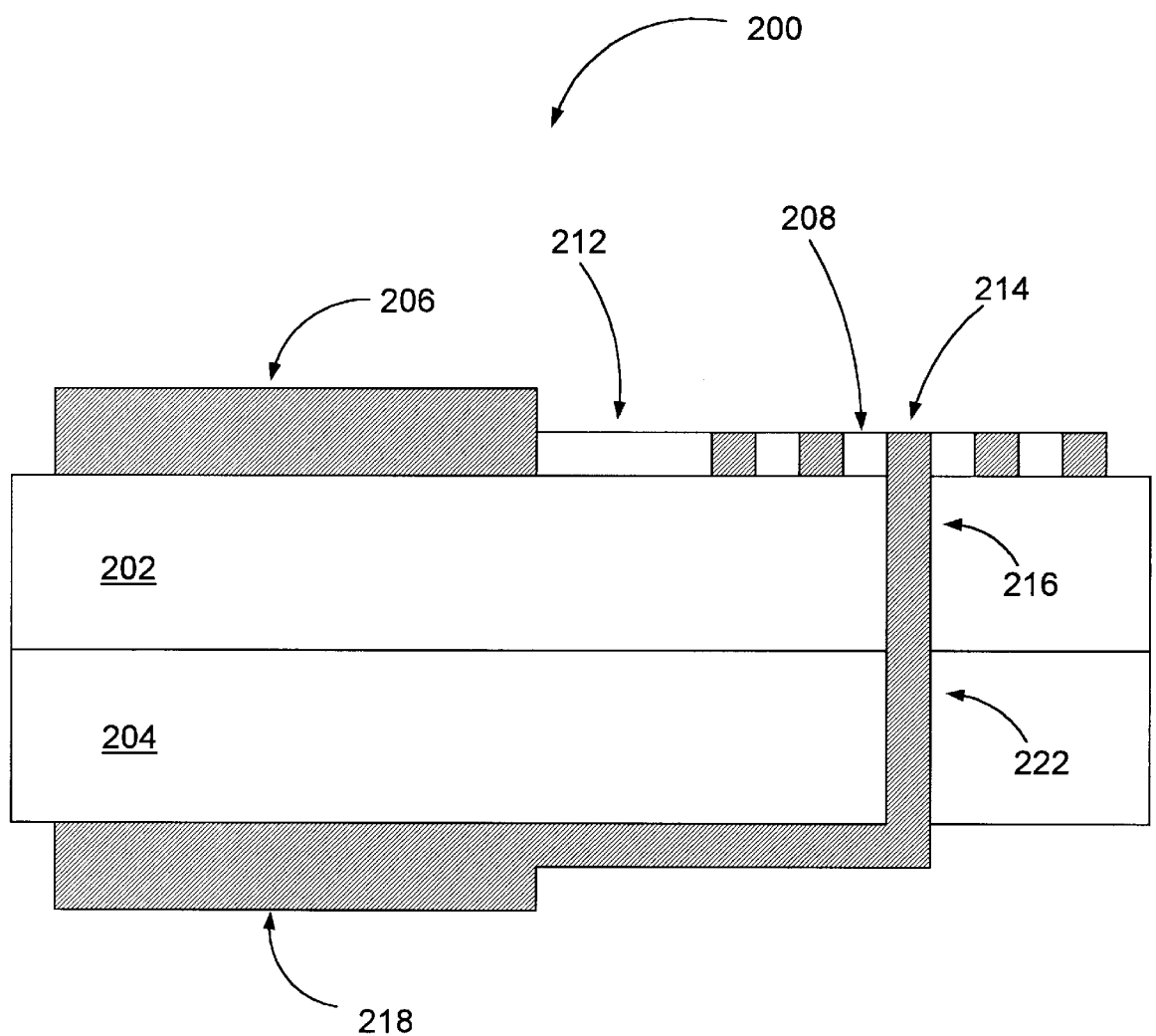
FIG. 6 is a cross-sectional view of the pressure sensor of FIG. 5.

It should be noted that certain non-ideal conditions exist with regard to temperature sensor 100 that may effect performance such as the change in the physical sizes of the area A and the distance D due to thermal expansion when heat is applied. In addition, the LC circuits all have a parasitic resistance that keeps the Q factor less than infinite. FIG. 6 shows a sectional view of the temperature sensor 200 fully assembled.

Combination LC Pressure and Temperature Sensor

Figure 7:
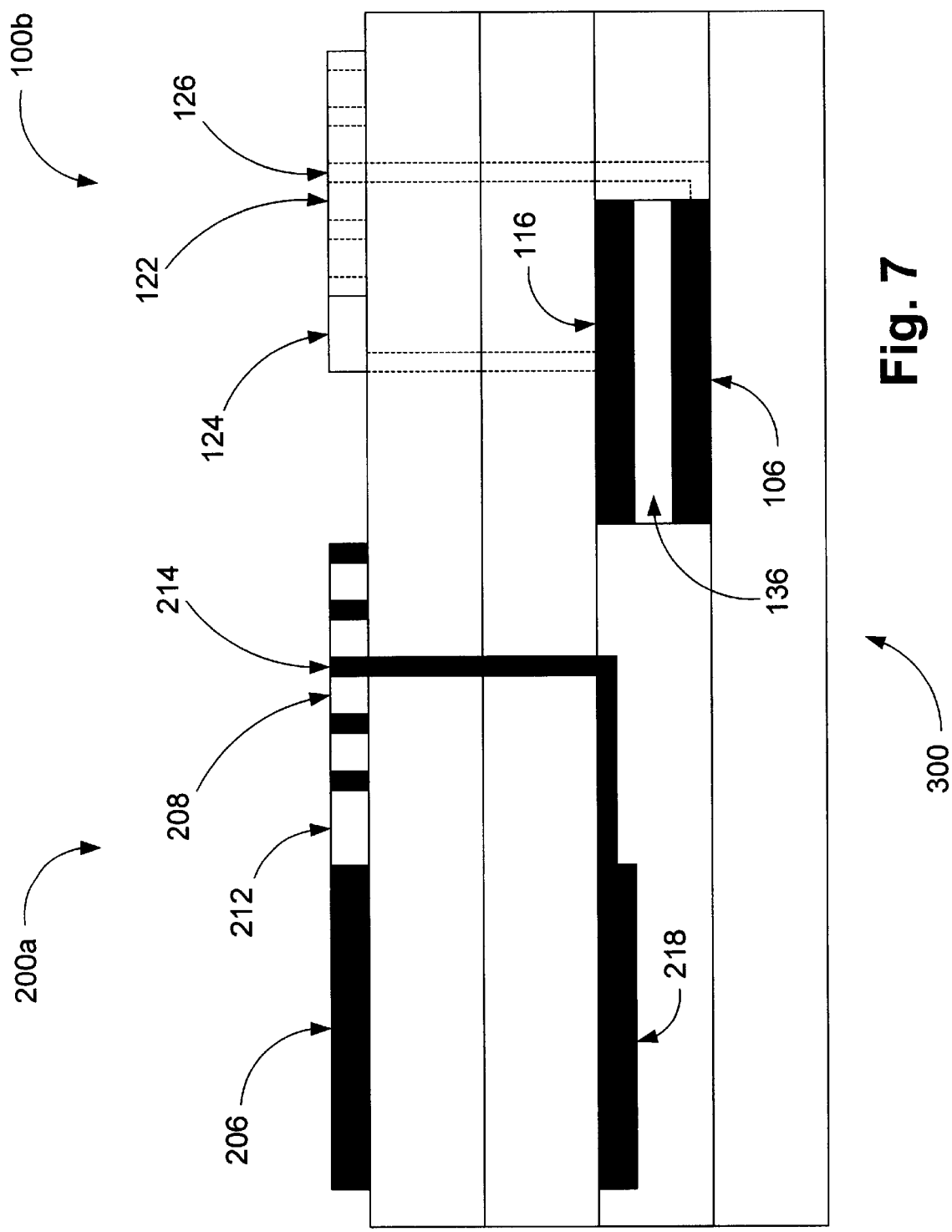
FIG. 7 is a cross-sectional view of a dual pressure and temperature sensor according to a third embodiment of the present invention.

Turning to FIG. 7, shown is a cross-section of a combination pressure and temperature sensor 300 of according to a third embodiment of the present invention. In the third embodiment, the pressure sensor 100 (FIG. 1) and the temperature sensor 200 (FIG. 5) are combined into the combination sensor 300. The combination sensor 300 features a pressure sensor 100b with a first conductor 106, an inductor coil 122, and a second conductor 116. A gap 136 is disposed between the first and second conductors 106 and 116. The inductor coil 122 includes an outer end 124 and an inner end 126. The structure of the pressure sensor 100b is similar to that of the pressure sensor 100 (FIG. 1) and is not discussed in further detail.

On the other end of the combination sensor 300 is a temperature sensor 200a with a first conductor 206, an inductor coil 208, and a second conductor 218. The inductor coil 208 includes an outer end 212 and an inner end 214. The structure of the temperature sensor 200a is similar to that of the temperature sensor 200 (FIG. 5) and is not discussed in further detail.

The combination sensor 300 is particularly useful when attempting to deconvolve any parasitic temperature effects in the pressure sensor 100b by providing an independent measure of temperature with the temperature sensor 200a. This temperature measurement can be used for external calibration of the pressure sensor 100b. For example, if the dependence of the pressure sensor 100b on both pressure and temperature is known (e.g., after a suitable calibration of the pressure sensor 100b), and the temperature of the pressure sensor 100b is independently measured, the operating temperature of the pressure sensor 100b is known and therefore from the original calibration of the pressure sensor 100b, an accurate temperature-calibrated pressure reading can be calculated.

This calculation may be performed on some accompanying external processor based computer or other circuit which operates on the temperature and pressure readings taken from the sensors 100b and 200a. It should be noted that an important advantage of this approach is that the sensor calibration all takes place externally, so no correcting circuitry need be incorporated directly on the sensor substrate and therefore potentially exposed to high temperature or require an internal power supply.

The independent measurement of the temperature is best accomplished by the temperature sensor 200a formed on the combination sensor 300 with the pressure sensor 100b so as to ensure good thermal contact between the sensors 100b and 200a to make sure the temperature reading of the temperature sensor 200a is in fact the temperature of the pressure sensor 100b. Also, care should be taken to ensure that the resonant frequencies of the sensors 100b and 200a are sufficiently different so as to prevent any interference between the two. That is to say that the range of frequencies over which each sensor 100b and 200a operates should not overlap with each other. This is accomplished by choosing appropriate values for the capacitance and inductance of each sensor 100b and 200a which result in the desired operating range of frequencies of the sensors 100b and 200a.

Also, the principles of construction including the micromachining methods as well as the materials discussed for the first and second embodiments apply to the third embodiment.

LCR Variable Resistance Sensor

Figure 8A:
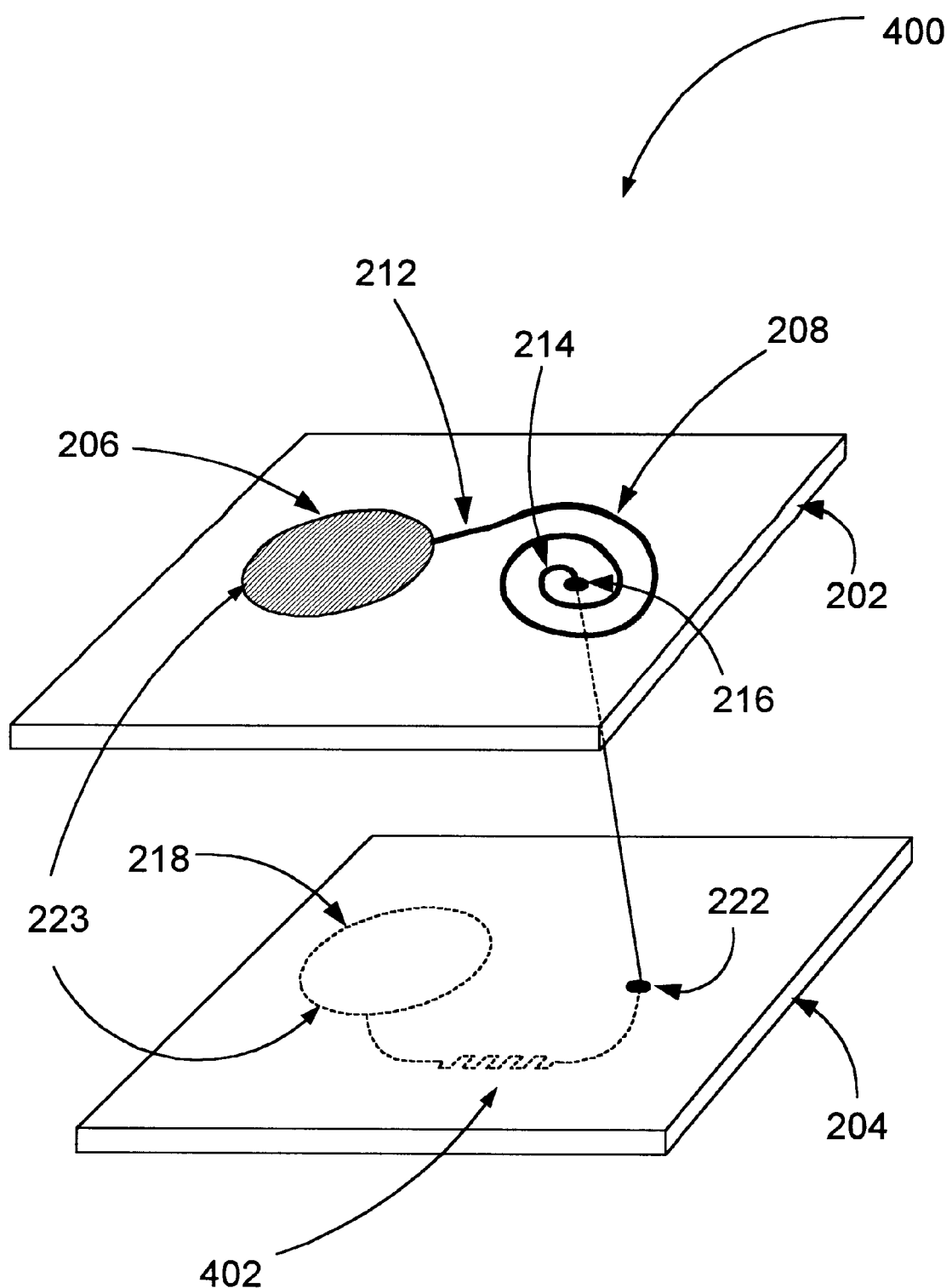
FIG. 8A is an assembly view of a temperature sensor according to a fourth embodiment of the present invention.

Turning next to FIG. 8A, shown is an assembly view of a variable resistance sensor 400 according to a fourth embodiment of the present invention. The variable resistance sensor 400 is similar to the temperature sensor 200 (FIG. 5) with the addition of a variable resistance 402 in series with the capacitor formed by the first and second conductors 206 and 218 and the coil inductor 208 as shown. This variable resistance 402 might also be incorporated into part of the inductor coil 208, or for that matter, the inductor coil 208 may be constructed by winding the variable resistance 402 in a coil form.

The addition of the variable resistance 402 affects the bandwidth of the resistive-inductive-capacitive (RLC) circuit as known in the art. Note that all previous sensors discussed herein did not actually have a resistor placed in the LC circuit, however a minimum resistance is inherent in the conductors used as is known in the art. The bandwidth is proportional to the variable resistance, the relationship being defined by $\beta=R/L$, where $\beta$ is the bandwidth of the RLC circuit, L is the inductance, and R is the resistance. Thus, once the inductance L of the variable resistance sensor 400 is known and the bandwidth of the circuit determined, the variable resistance 402 can be calculated, revealing the temperature or other parameter which is tied to the value of the variable resistance 402.

Figure 8B:
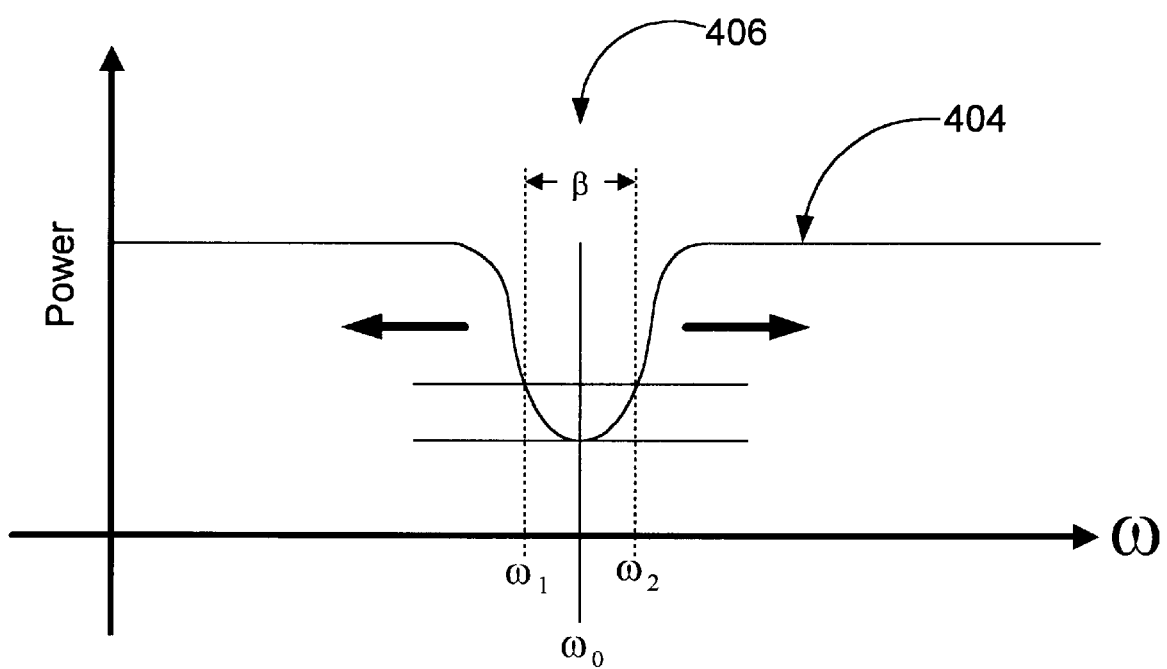
FIG. 8B is a graphical plot of the bandwidth of a resonant circuit of the temperature sensor or FIG. 8A.

Turning to FIG. 8B, shown is a graph of a frequency plot of the power of an excitation signal 404 with a notch 406 created by the electromagnetic coupling of the variable resistance sensor 400 to the excitation signal source (not shown). The excitation signal 404 is comprised of multiple frequencies or "white noise." The variable resistance sensor 400 absorbs energy at the resonant frequency of its RLC circuit resulting in the notch 406. The bandwidth $\beta$ may be determined by finding the points on the notch 406 which are 3 db up from the center frequency $\omega_0$. These points lie at $\omega_1$ and $\omega_2$. The bandwidth $\beta$ is equal to the difference $\omega_2-\omega_1$.

It is understood that the resistance of the circuit includes the variable resistance 402 plus the resistance inherent in the conductors of the RLC circuit. However, it is further understood that the variable resistance 402 is large in comparison to the inherent resistance and predominates.

The variable resistance 402 can be chosen to effect change in response to any one of a number of factors. For example, the variable resistance may change with temperature, exposure to a specific chemical species, or other factor known by those skilled in the art. In fact, it is well known in the sensing art that there are a variety of materials the electrical resistance of which varies depending on the environment in which the materials are placed. Examples include chemical sensors based on semiconducting and other materials, strain sensors based on piezoresistive materials, and temperature sensors based on the change of the resistivity of the material with temperature.

Also, the discussion of micromachining techniques and the various materials that may be used in conjunction with the first embodiment applies equally to the fourth embodiment as well.

LCR Variable Resistance Sensor with Variable Pressure

Figure 9:
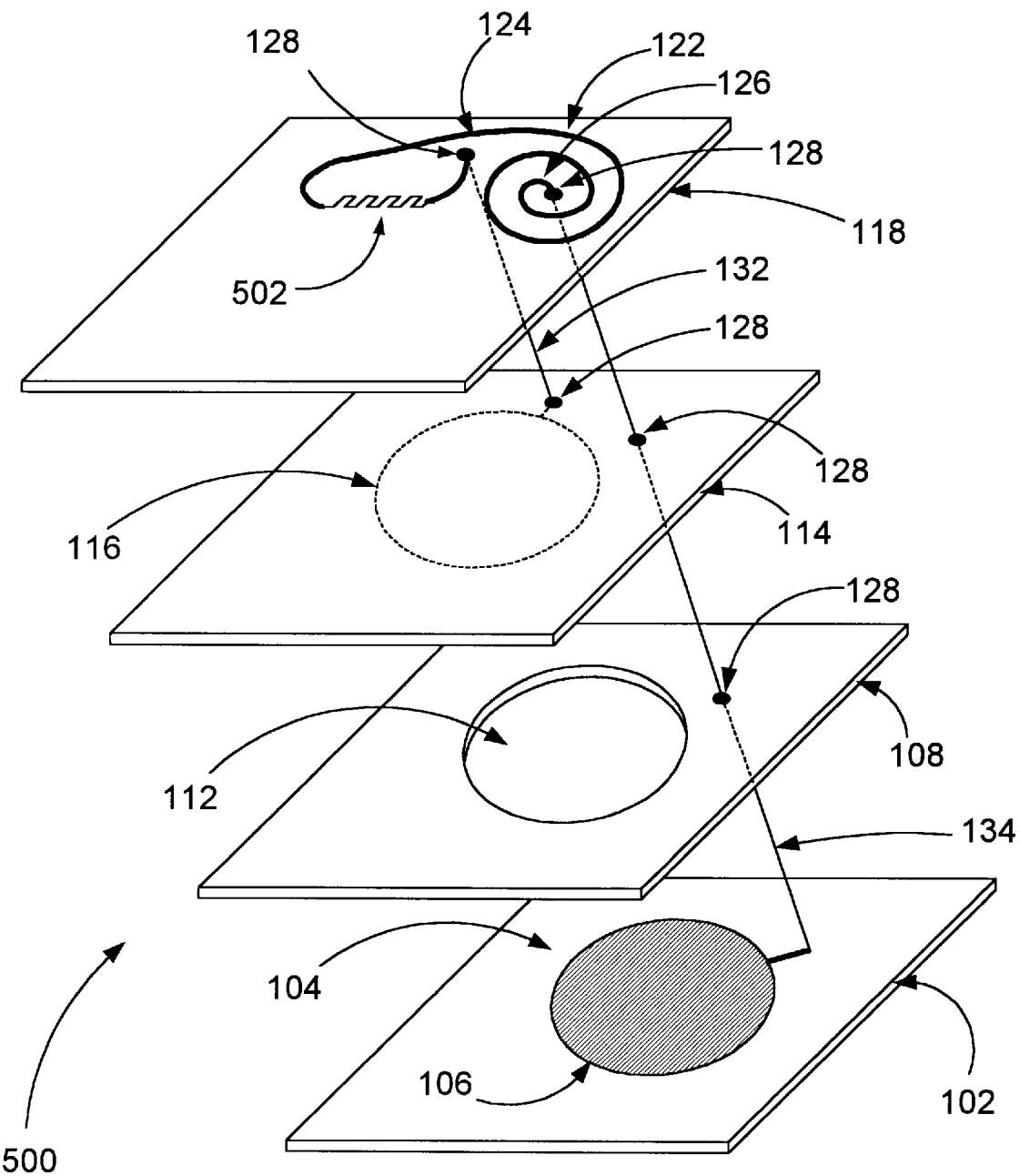
FIG. 9 is an assembly view of a dual pressure and temperature sensor according to a fifth embodiment of the present invention.

Referring to FIG. 9, shown is an assembly view of a combined pressure and temperature sensor 500 according to a fifth embodiment of the present invention. The temperature sensor 500 is similar to the pressure sensor 100 with the addition of a variable resistance 502 included in the resonant circuit. With respect to the variable resistance 502, the above discussion of the fourth embodiment of determining the variable resistance 402 from the bandwidth of the resonant circuit is applied in determining the value of the variable resistance 402 of the fifth embodiment as well. In addition, the discussion of the first embodiment relating to the determination of the pressure based on the resonant frequency of the resonant circuit applies equally to the fifth embodiment. Note that since the pressure depends of the frequency of the circuit and the variable resistance is based on the bandwidth of the resonant circuit, both variables may be determined independently.

Finally, once again, the discussion of micromachining techniques and the various materials that may be used in conjunction with the first embodiment applies equally to the fifth embodiment as well.

Note it is a characteristic of all of the sensors described above that they are completely self-contained. In this context, self-contained means that the sensors do not require external wire leads to external circuitry or power sources, nor is there an optical coupling to the sensor to receive information. Also, it is an additional characteristic in that all of the above described sensors are completely passive in that there is no internal power source or battery.

Excitation of the Resonant Circuits in the Sensors

The following discussion outlines various systems that may be employed to induce a current in the resonant circuits of the sensors described above.

Figure 10:
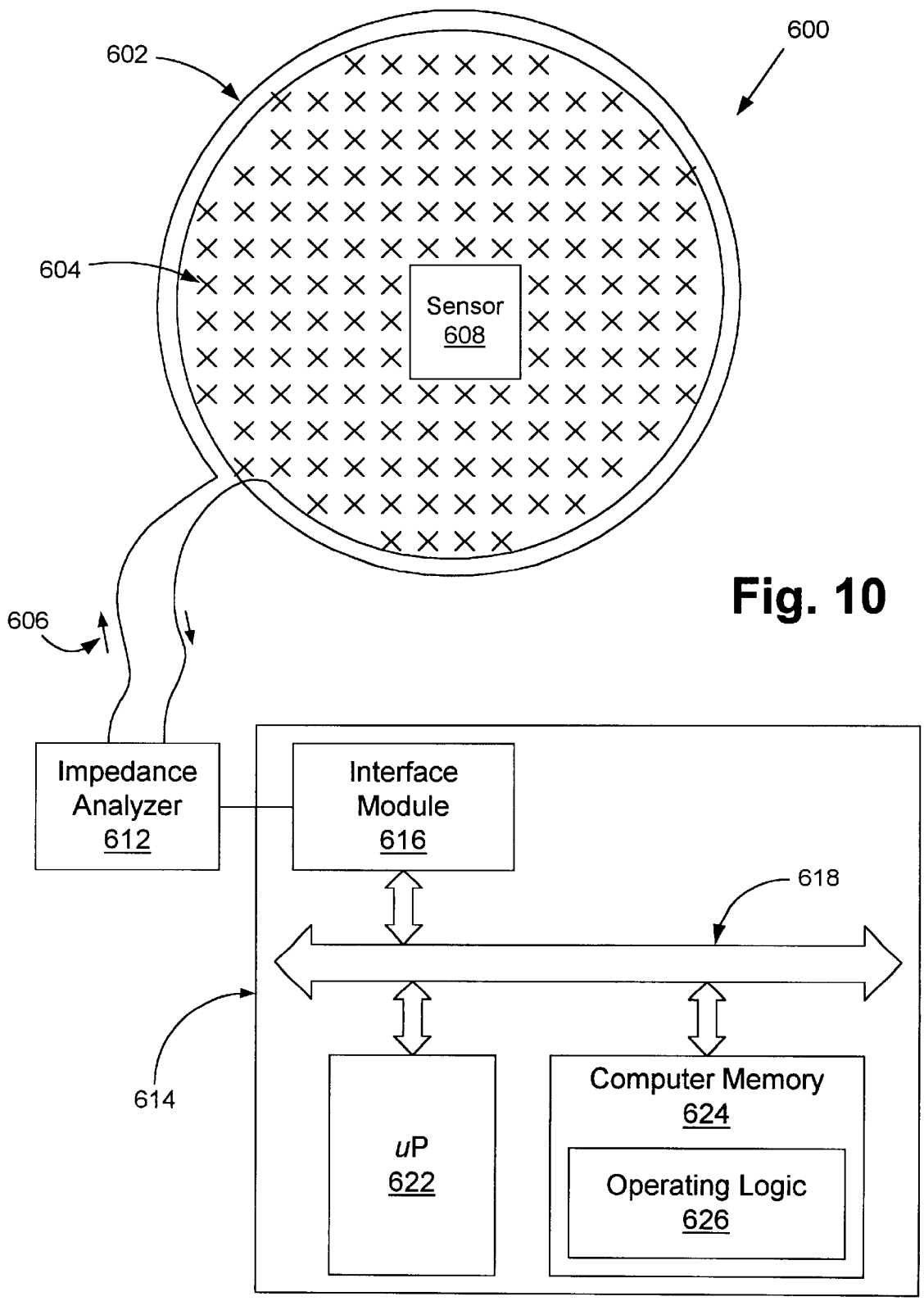
FIG. 10 is a block diagram of an excitation system that measures the impedance of the sensor.

Turning to FIG. 10, shown is an impedance excitation system 600 which may be applied in conjunction with any of the above described sensors. The impedance excitation system 600 is comprised of a transmitting antenna 602 which forms an electromagnetic field 604 is when an excitation signal 606 is applied. Disposed within the perimeter of the transmitting antenna 602 in the electromagnetic field 604 is a sensor 608. The sensor 608 may be any one of the sensors associated with the first, second, third, fourth, or fifth embodiments of the present invention discussed above. Note the location of the sensor 608 is such that the inductor coil resident on the sensor 608 is electromagnetically coupled to the transmitting antenna 602.

The transmitting antenna 602 is electrically coupled to an impedance analyzer 612 which in turn is electrically coupled to a computer system 614 through an interface module 616. The interface module 616 is electrically coupled to a data bus 618. The data bus 618 is electrically coupled to a processor 622 and a computer memory 624. The operating logic 626 by which the impedance excitation system 600 is controlled is stored on the computer memory 624.

During the operation of the impedance excitation system 600, the computer system 614 acting pursuant to the operating logic 626 measures the impedance of the transmitting antenna 602 by applying an excitation signal 606 with voltage of constant amplitude and measuring the magnitude and phase of the resultant current while varying the frequency across a predetermined frequency range. The sensor 608 is electromagnetically coupled to the transmitting antenna 602. When the frequency of the excitation signal 602 is equal to the resonant frequency of the resonant circuit of the sensor 608, then an increase in current of the excitation signal 606 is seen due to a corresponding drop in the impedance of the resonant circuit. The computer system 614 detects this change in current/impedance and may determine the resonant frequency and the bandwidth of the resonant circuit of the sensor 608.

Figure 11:
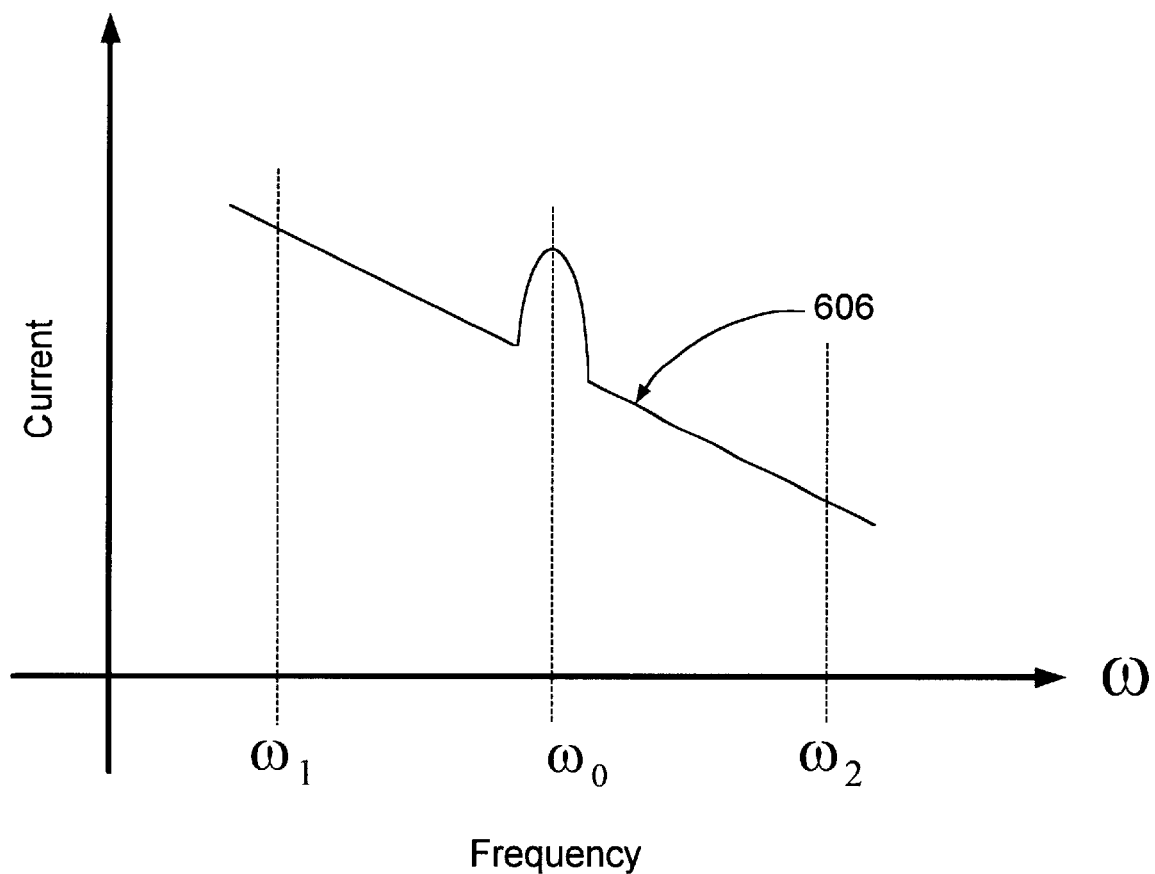
FIG. 11 is a graphical plot of the current through the transmitting antenna as determined by the excitation system of FIG. 10.

Referring to FIG. 11, shown is a plot of the frequency spectrum of the magnitude of the current through the transmitting antenna 602 (FIG. 10). The frequencies at which the impedance is measured ranges from $\omega_1$ to $\omega_2$ as shown. At the resonant frequency $\omega_0$ of the resonant circuit in the sensor 608, the impedance of the transmitting antenna 602 drops and the current peaks, interrupting the purely inductive behavior of the transmitting antenna 602 observed at frequencies $\omega$ far from the resonant frequency $\omega_0$.

An alternative approach involves measuring the phase angle difference between the voltage applied to the transmitting antenna 602 and the measured current in the transmitting antenna 602. At frequencies far from the resonant frequency $\omega_0$, the phase difference will approach 90°. At the resonant frequency $\omega_0$, the phase difference drops to a minimum value, allowing determination of the resonant frequency $\omega_0$ and bandwidth from the notch created. Unlike the impedance and current behavior, the phase is relatively constant at frequencies far from the resonant frequency $\omega_0$, which may simplify measurement in some cases.

Figure 12:
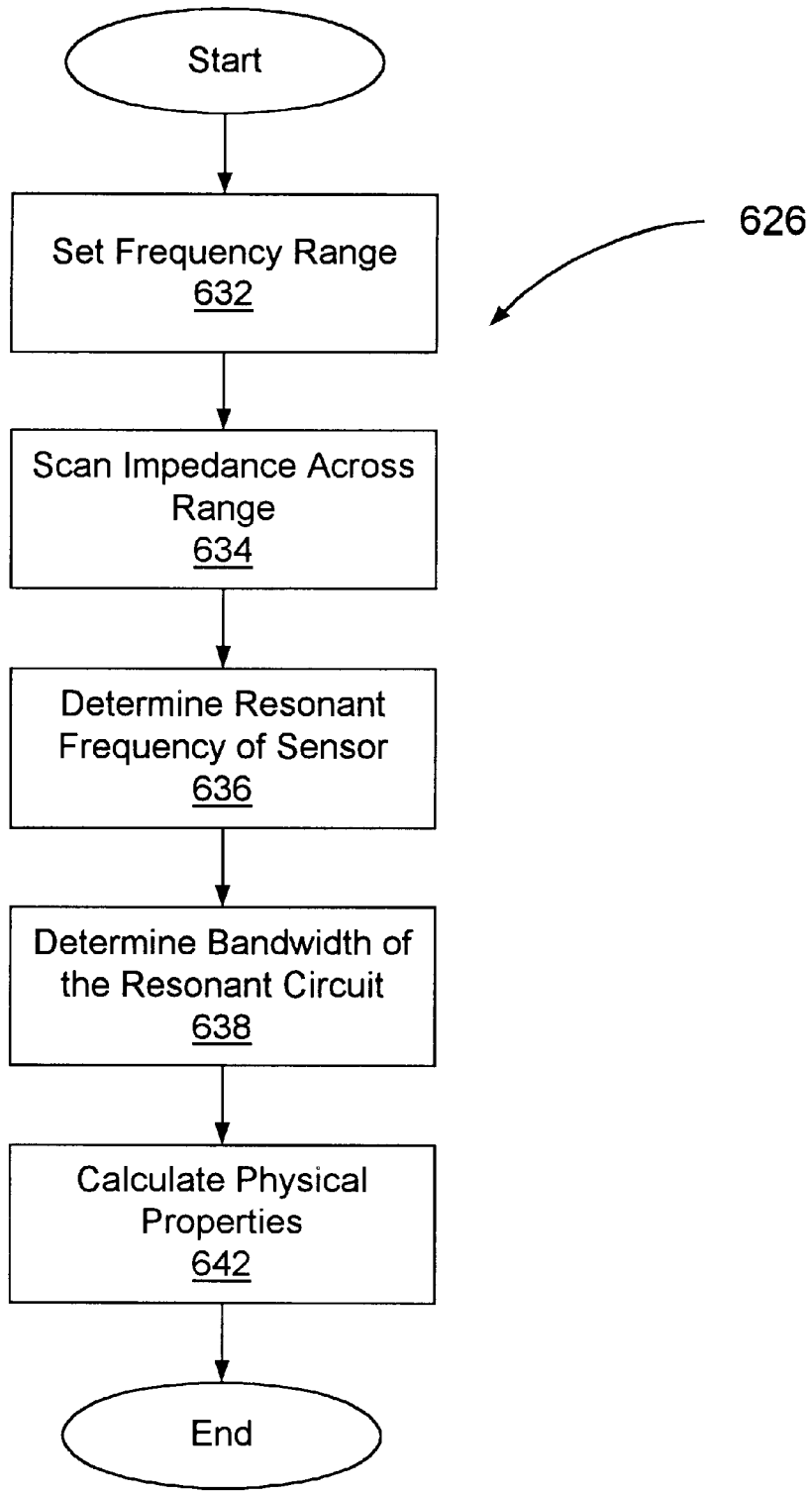
FIG. 12 is flow diagram of the operating logic employed by the excitation system of FIG. 10.

Turning then to FIG. 12, shown is a flow chart of the operating logic 626 which controls the impedance excitation system 600. In block 632, the frequency range at which the impedance of the transmitting antenna 602 (FIG. 10) is set. Next, in block 634, the impedance of the transmitting antenna 44 is scanned with an excitation signal 606 (FIG. 10) with frequency varying across the predetermined range. In block 636, the resonant frequency of the resonant circuit of the sensor 608 (FIG. 10) is determined by examining the center frequency $\omega_0$ (FIG. 11) of the peak in the current. In block 638, the bandwidth of the resonant circuit of the sensor 608 is determined. Finally, in block 642 the physical properties linked to the resonant frequency and the bandwidth are ascertained. Note it is not necessary to perform the steps in blocks 638 or 642. These blocks are executed only if necessary to calculate the specific physical property depending upon the type of sensor 608 employed. Also, in a further operation, the temperature calibration discussed in the third embodiment may be performed.

Figure 13:
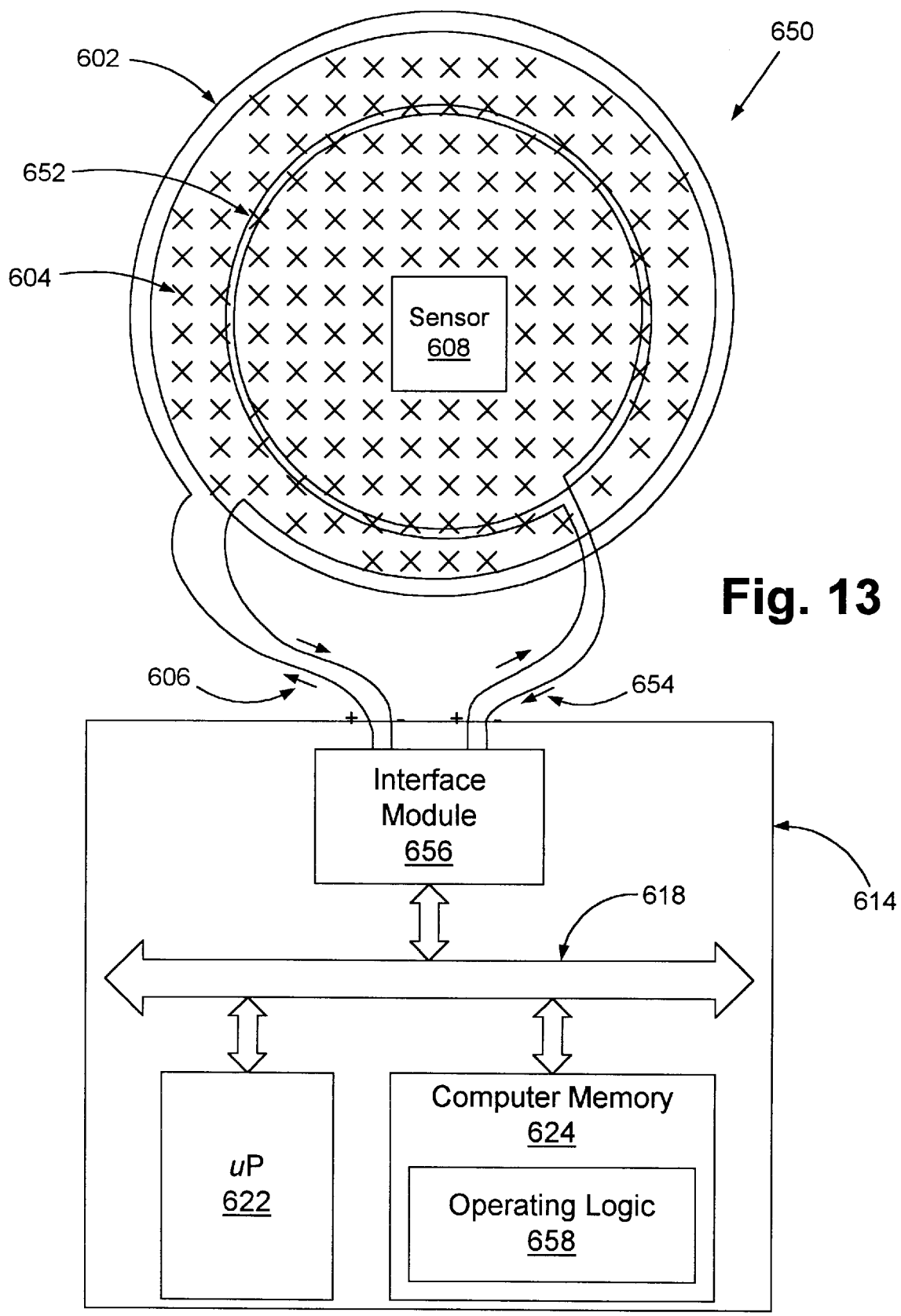
FIG. 13 is a block diagram of an excitation system that uses a transmit and receive antenna.

Referring next to FIG. 13, shown is a transmit/receive excitation system 650 which may be applied in conjunction with the above described sensors. The transmit/receive excitation system 650 features a transmitting antenna 602 which forms a time-varying electromagnetic field 604 is when an excitation signal 606 is applied. Disposed within the perimeter of the transmitting antenna 602 in the electromagnetic field 604 is a sensor 608. The sensor 608 may be any one of the sensors associated with the first, second, third, fourth, or fifth embodiments of the present invention discussed above.

The transmit/receive excitation system 650 also includes a receiving antenna 652. Note that the relative positions of the transmitting antenna 602 and the receiving antenna 652 are such that they are not concentric. As shown, the receiving antenna 652 is in front of the transmitting antenna 602. The goal of the placement of the receiving antenna relative to the placement of the transmitting antenna 602 and the sensor 608 is to allow the receiving antenna to capture as much electromagnetic flux that has traveled through the sensor 608 within its periphery. This placement takes into consideration the path of the flux of the electromagnetic field 604 which is understood by those skilled in the art.

Both the transmitting antenna 602 and the receiving antenna 652 are in electrical communication with the computer system 614 through the interface module 656 which provides an interface between the transmitting and receiving antennas 602 and 652 and the data bus 618. The data bus 618 is electrically coupled to a processor 622 and a computer memory 624. The operating logic 658 by which the transmit/receive excitation system 650 is controlled is stored on the computer memory 624.

Next, the general operation of the transmit/receive excitation system 650 is described. According to the first embodiment, pursuant to the operating logic 658, the computer control system 614 applies a predetermined excitation signal 606 to the transmitting antenna 602. Or, put another way, together, the computer control system 614 and the transmitting antenna 602 act as a transmitter which transmits the excitation signal 606. The excitation signal 606 is transmitted in the form of a time-varying electromagnetic field 604. The electromagnetic field 604 in turn induces a current in the sensor 608 and the receiving antenna 57. Thus, according to the present invention, the resonant circuit in the sensor 608 is electromagnetically coupled to the transmitting antenna 602, or alternatively, the transmitter. Likewise, the receiving antenna 652 is electromagnetically coupled to the transmitting antenna 602.

The current induced in the resonant circuit of the sensor 608 oscillates at the resonant frequency of the sensor circuit. In effect, the sensor 608 robs energy from the electromagnetic field 652 centered at its resonant frequency. The loss of energy from the electromagnetic field 604 is observed in the received signal 654. In other words, the received signal 654 is a modified version of the excitation signal 606 due to the energy loss. The computer control system 614 determines the precise center frequency $\omega_0$ of the energy loss, thereby determining the resonant frequency of the resonant circuit of the sensor 608. The computer control system 614 also calculates the bandwidth of the resonant circuit based on the received signal 654.

Figure 14A:
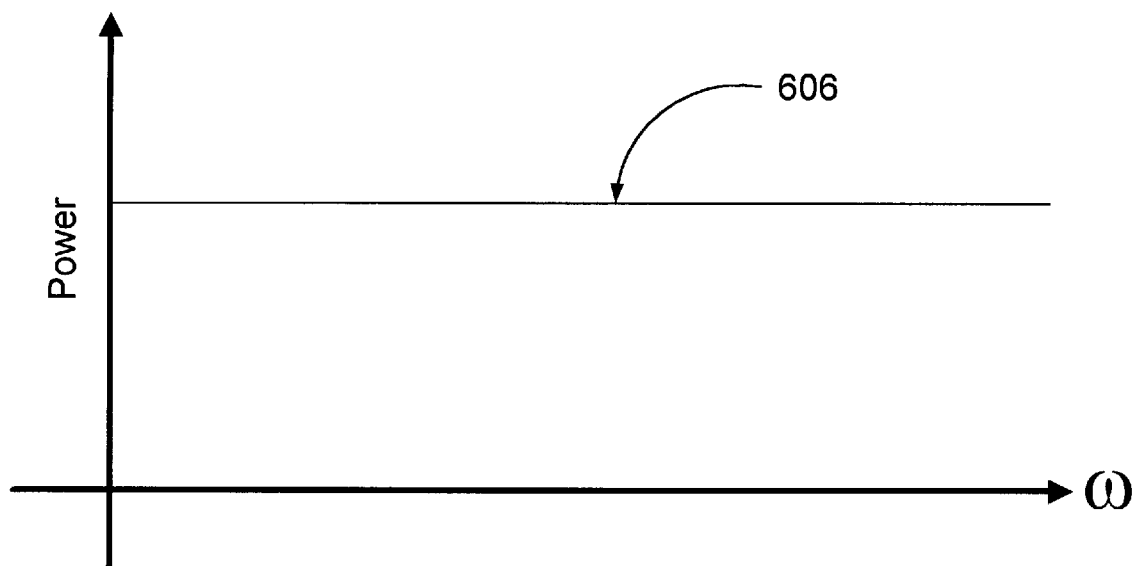
FIG. 14A is a graphical plot of a frequency spectrum of an excitation signal transmitted by the excitation system of FIG. 13.

Turning to FIG. 14A, shown is a plot of the frequency spectrum of the excitation signal 606 (FIG. 13). The magnitude of the curve is either the power of the excitation signal 606, and varies with the frequency $\omega$. The excitation signal 606 is typically referred to as "white noise" in that the magnitude is constant over the entire span of frequencies being transmitted.

Figure 14B:
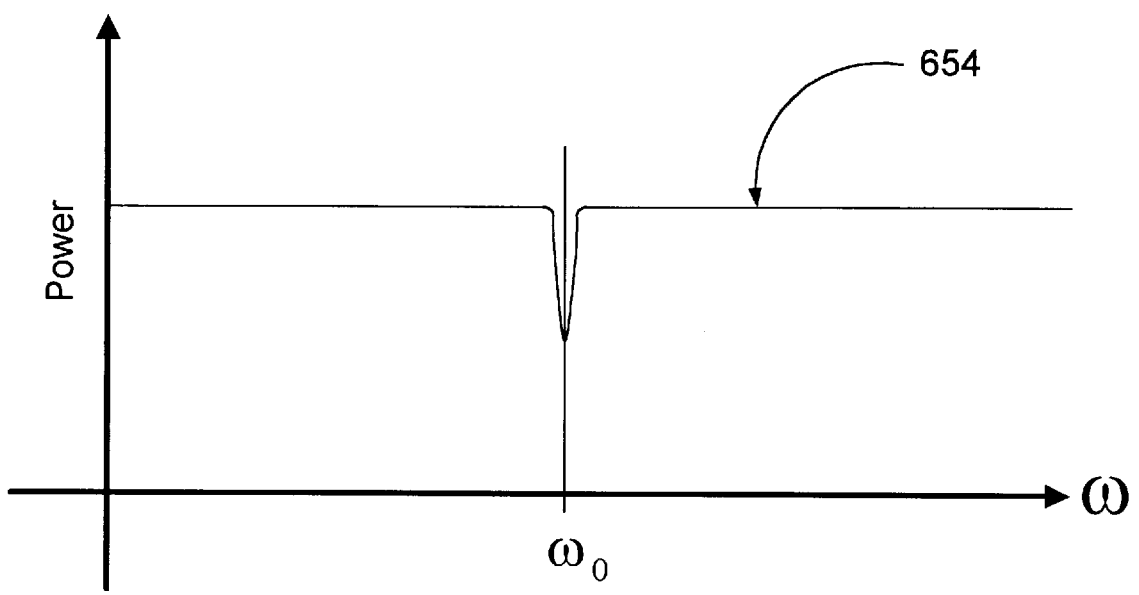
FIG. 14B is a graphical plot of a frequency spectrum of an excitation signal received by the excitation system of FIG. 13.

Turning to FIG. 14B, shown is a graph of the frequency spectrum of the received signal 654. This frequency plot is essentially the same as the frequency spectrum of the excitation signal 606 (FIG. 14A) except a notch is seen with a center frequency $\omega_0$. The notch represents the energy which was absorbed by the sensor 608 (FIG. 13). If the phase of the received signal 654 is shown, then the notch is a dip in the phase. The center frequency $\omega_0$ is the resonant frequency of the resonant circuit of the sensor 608.

Figure 15:
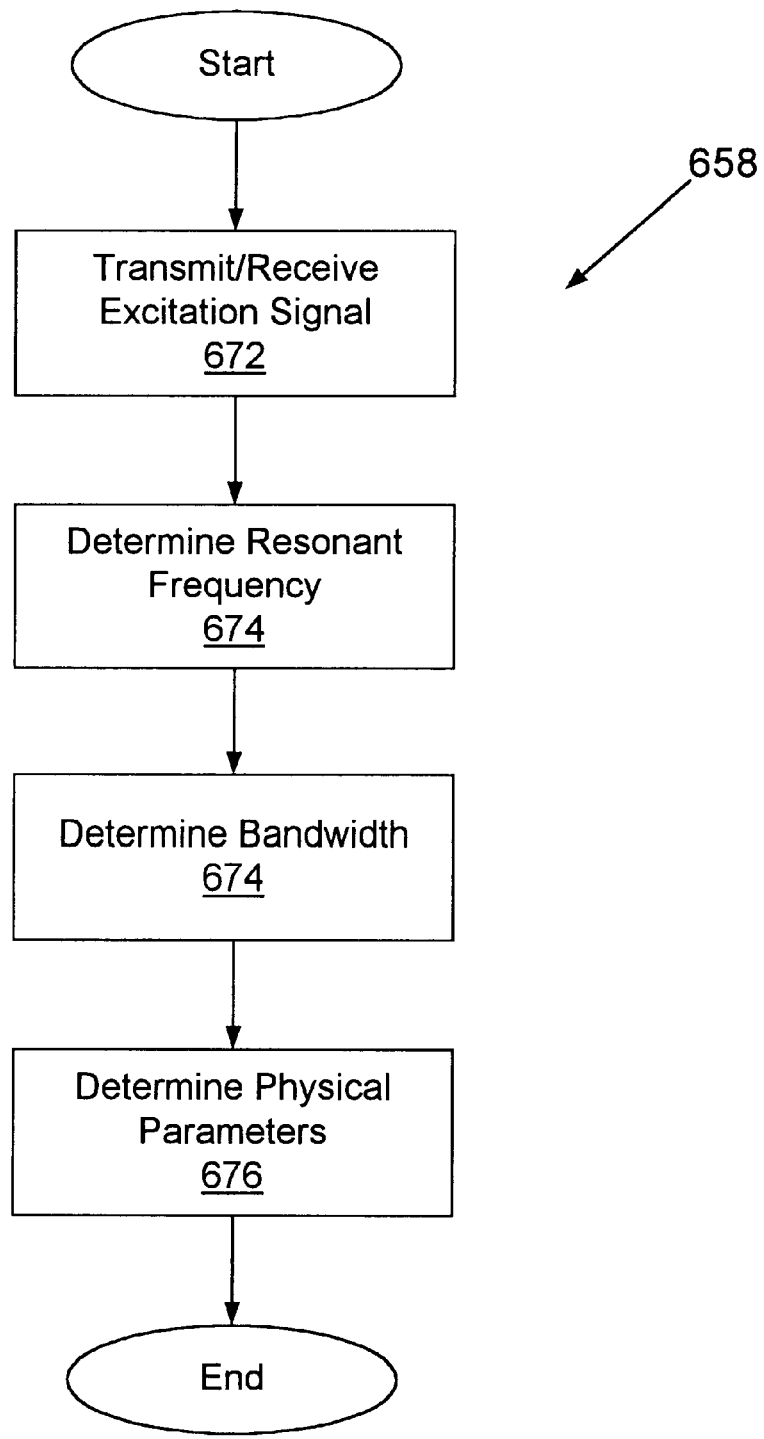
FIG. 15 is flow diagram of the operating logic employed by the excitation system of FIG. 13.

Referring next to FIG. 15, shown is a flow chart of the operating logic 658. In block 672, an excitation signal is transmitted and received via the transmitting and receiving antennas 602 and 652 (FIG. 13). In block 674, the resonant frequency of the resonant circuit is determined based upon the center frequency $\omega_0$. Next, the bandwidth of the resonant circuit is determined from the received signal 654. Finally, in block 676, the desired physical parameters of the environment surrounding the sensor 608 are determined either from the resonant frequency or the bandwidth.

Figure 16:
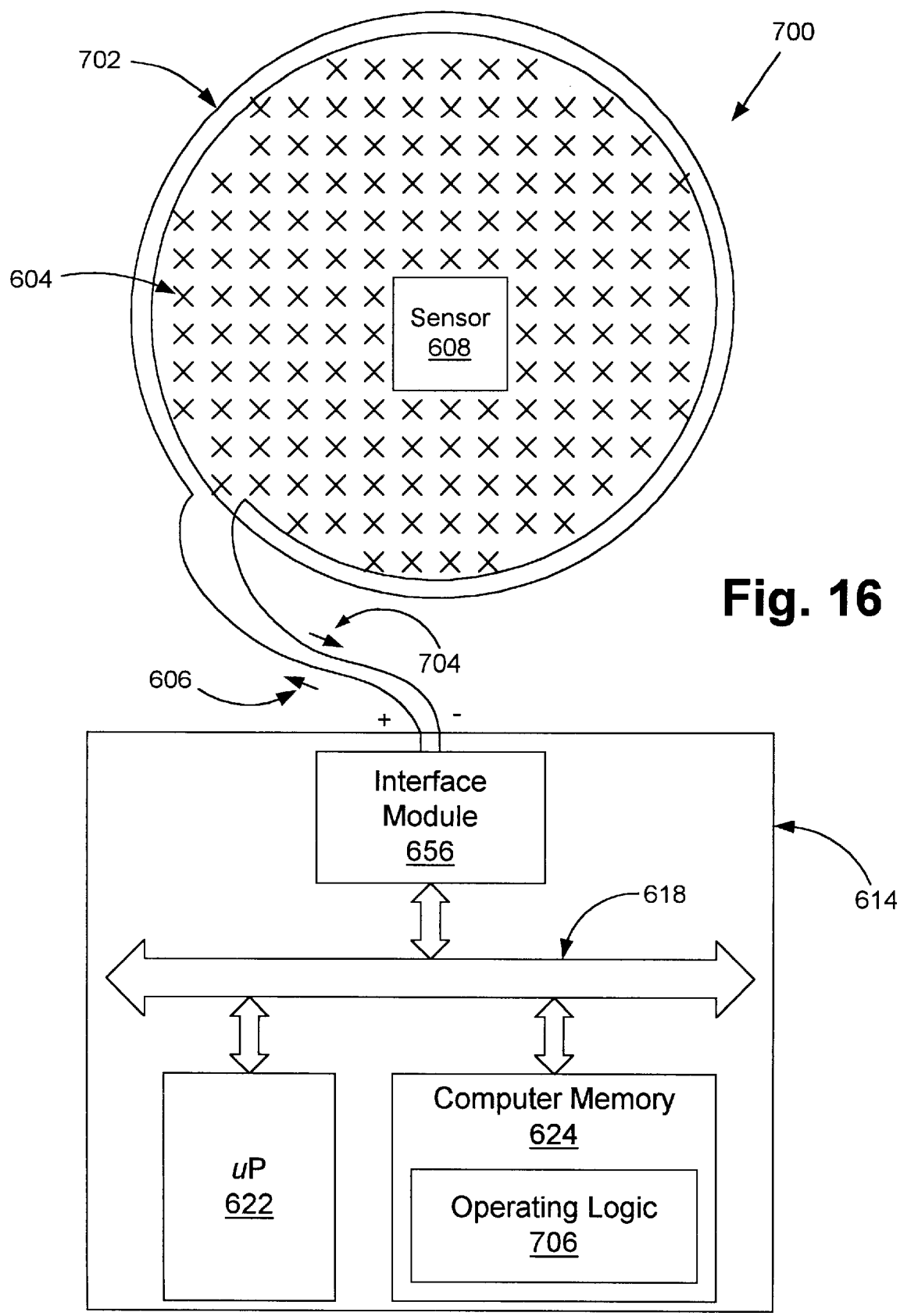
FIG. 16 is a block diagram of a chirp excitation system that uses a single antenna.

Turning next to FIG. 16, shown is a chirp excitation system 700 which may be applied in conjunction with the above described sensors. The chirp excitation system 700 is similar to the transmit/receive excitation system 650 (FIG. 16) with the exception that a single antenna 702 is used for both transmitting and receiving. The excitation signal 704 is a chirp which includes all frequencies or white noise for a specific duration of time. After the excitation ceases, the system reverts to a listen mode and the return signal 704 generated by the sensor 608 pursuant to the operating logic 706 is received by the single antenna 702. The operating logic 706 is similar to the operating logic 658 (FIG. 15) with the exception that a single antenna 702 is used. Consequently, the operating logic 658 is not described in detail.

Figure 17A:
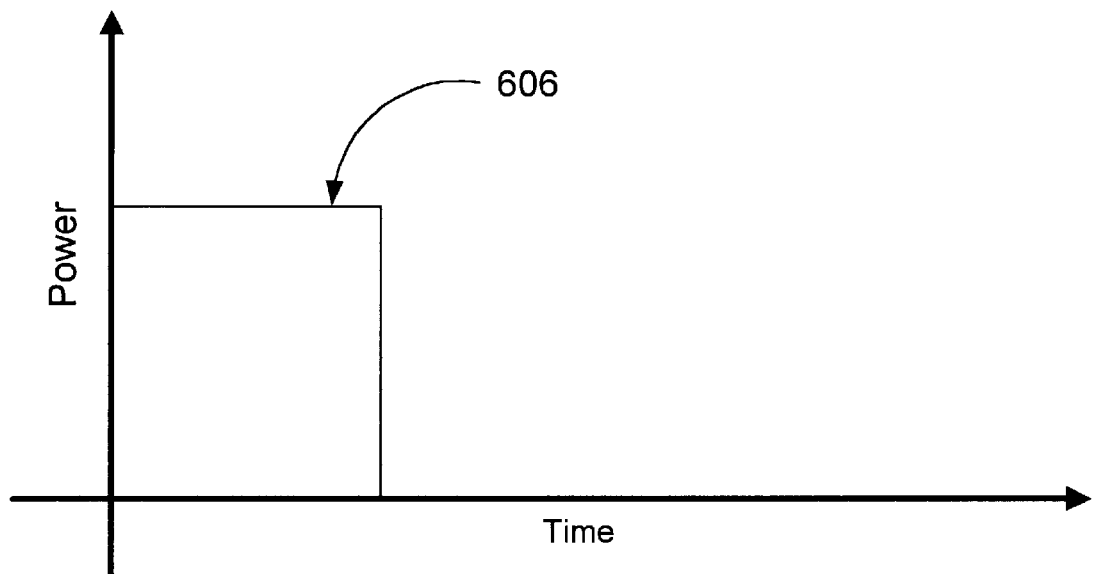
FIG. 17A is a graphical plot of an excitation signal employed in the chirp excitation system of FIG. 16.

With reference to FIG. 17A, shown is a plot of the frequency spectrum of the excitation signal 606 (FIG. 16). The magnitude of the curve is either the power of the excitation signal 606, and varies with the frequency ω. The excitation signal 606 is typically referred to as "white noise" in that the magnitude is constant over the entire span of frequencies transmitted.

Figure 17B:
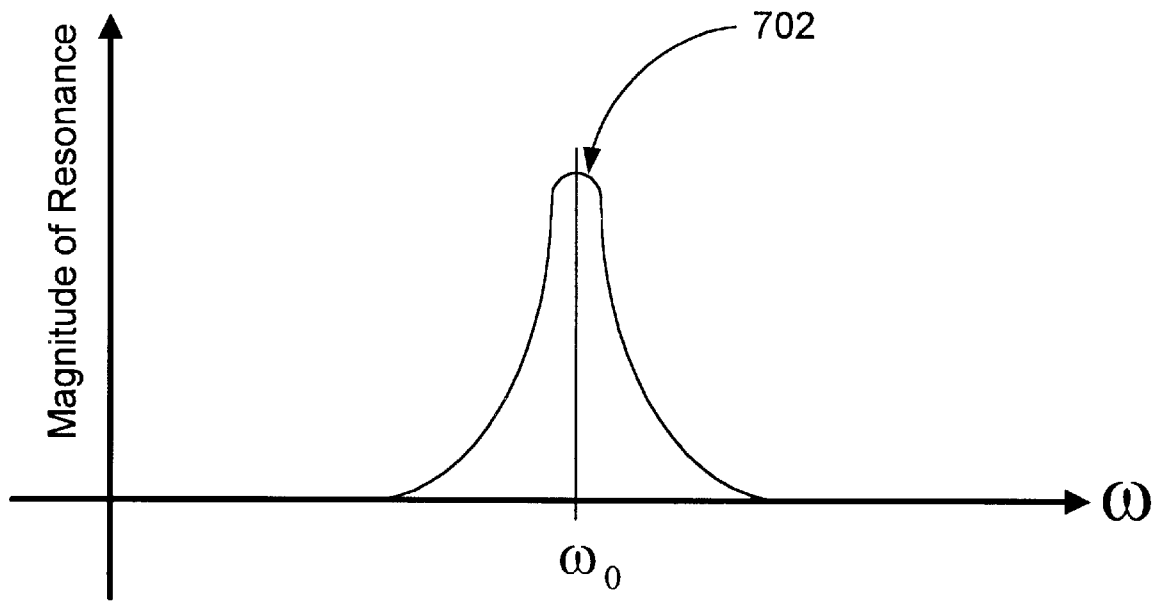
FIG. 17B is a graphical plot of a received signal in the chirp excitation system of FIG. 16.

Referring to FIG. 17B, shown is a graph of the frequency spectrum of the received signal 704. Basically there exists a peak at frequency $\omega_0$, which is the resonant frequency of the resonant circuit on the sensor 608 (FIG. 16). The center frequency $\omega_0$ is the resonant frequency of the resonant circuit of the sensor 608.

Figure 18:
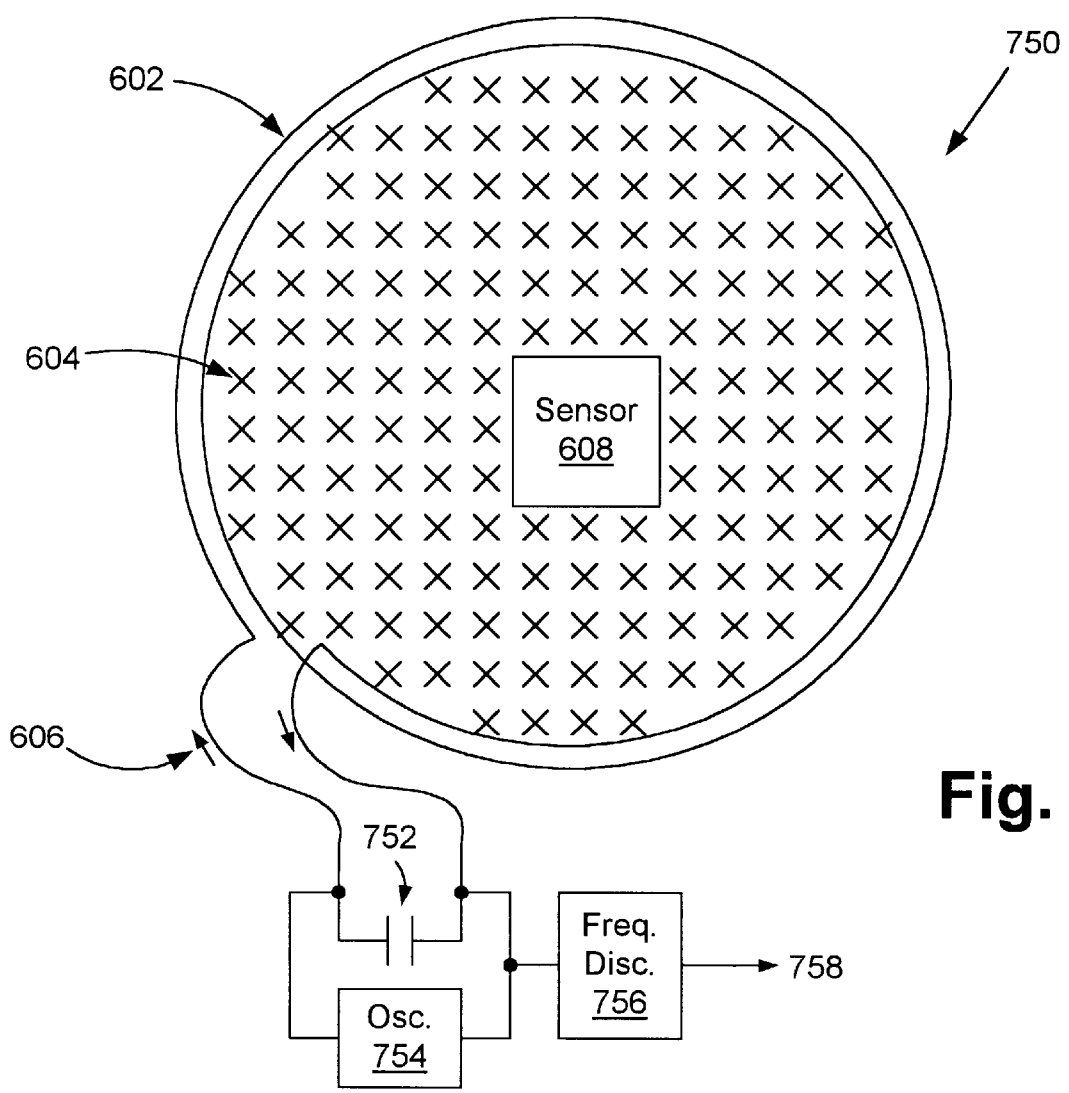
FIG. 18 is a block diagram of an excitation signal system employing a tank circuit.

Turning to FIG. 18, shown is an oscillator excitation system 750 which may be applied in conjunction with the above described sensors. The component parts of the oscillator excitation system 750 include a transmitting antenna 602. When an excitation signal 606 is applied to the transmitting antenna 602, an electromagnetic field 604 is induced in the center of the transmitting antenna 602. A sensor 608 is placed within the perimeter of the transmitting antenna 602 within the electromagnetic field 604.

The transmitting antenna 602 is electrically coupled in parallel with a capacitor 752. Together the transmitting antenna 602, which in electrical terms is an inductor, coupled with the capacitor 752 make a resonant circuit or tank circuit. The common terminals of the transmitting antenna 602 and the capacitor 752 are electrically coupled to the input and output of an oscillator 754 as shown. The output of the oscillator 754 is electrically coupled to a frequency discriminator 756. The frequency discriminator 756 produces an output signal 758 which may be a DC voltage, direct current, or other signal. By placing the sensor 608 within the electromagnetic field 604, the sensor 608 is electromagnetically coupled to the transmitting antenna 602.

Next the operation of the above circuit is described. The oscillator 754 produces an electrical signal that resonates at the resonant frequency of the tank circuit created by the transmitting antenna 602 and the capacitor 752. The signal oscillates at a frequency determined by the electrical characteristics of the tank circuit as is known by those skilled in the art. The resonant frequency of the tank circuit is altered by the electromagnetic coupling with the sensor 608.

The oscillating signal from the oscillator 754 is then fed into a frequency discriminator which then converts the frequency signal to a voltage or other signal that is proportional to the sensor modified frequency of the oscillator circuit. The resonant frequency of the sensor 608 is determined from this signal.

Figure 19:
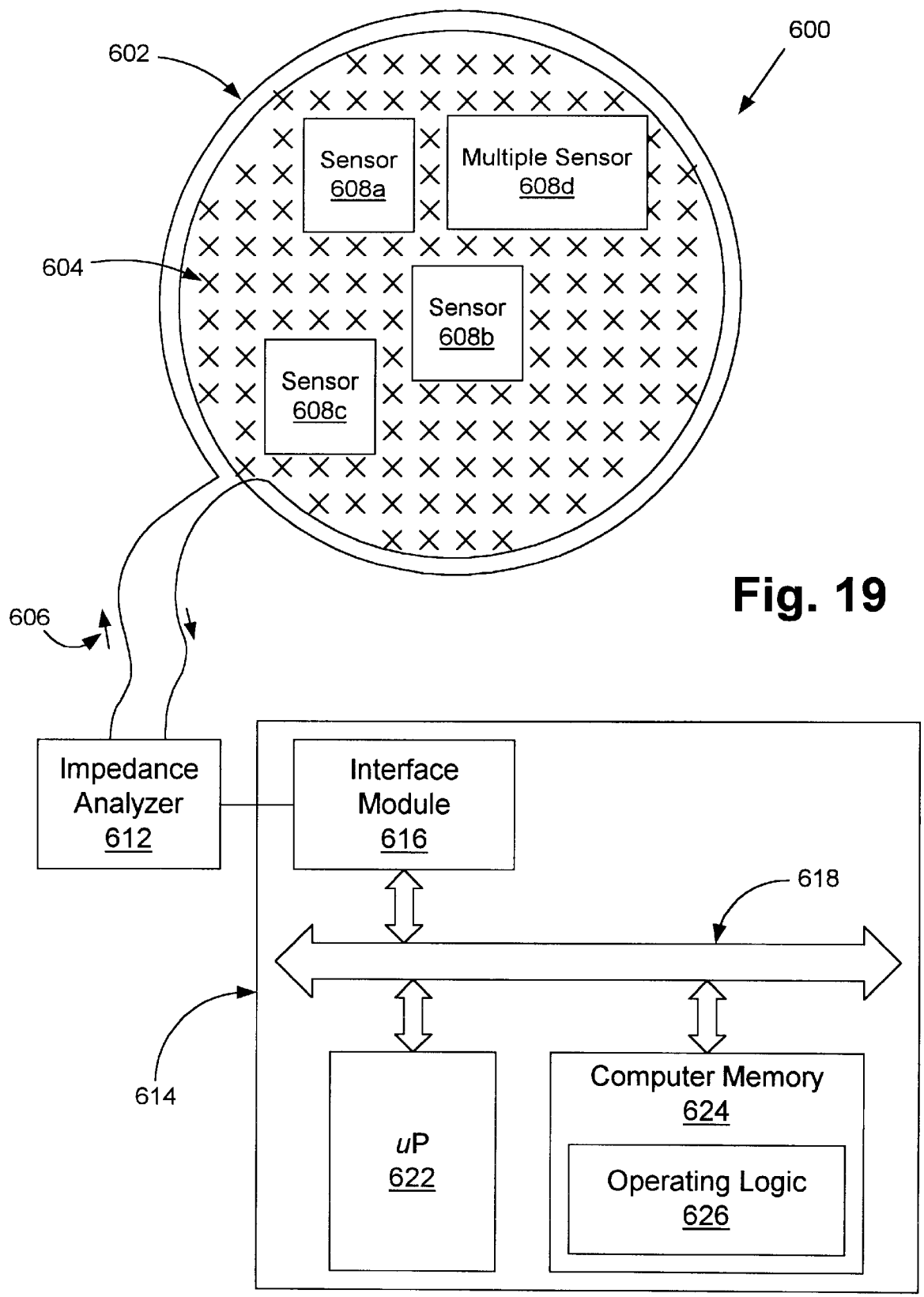
FIG. 19 is a block diagram of the excitation system of FIG. 10 with multiple sensors.

Referring to FIG. 19, shown is the an impedance excitation system 600 which was depicted in FIG. 10 with a number of sensors 608*a*–608*d*. The present invention offers a distinct advantage in that several sensors 608 may be employed in the same environment at the same time. The use of multiple sensors 608 simultaneously can provide redundant and more accurate measurement of a physical characteristic measured. Also, several different physical characteristics may be measured at the same time, or spatial resolution of physical characteristics may be determined. The use of multiple sensors 608 involves configuring each sensor 608 to operate within a specific unique frequency band in a scheme much like frequency multiplexing.

Also note, the multiple sensor 608*d* features multiple resonant circuits similar to the combination sensor 300 (FIG. 7). As this implies, the multiple sensor 608*d* may have any number of individual resonant circuits, and, consequently, individual sensors which will sense any number of physical parameters resident on the same sensor structure. The precise method in which multiple sensors 608*d* can be formed so as to be resident on the same sensor structure by, for example, spatial repetition of the lithographic patterns used to form individual sensors during the manufacturing process, is known to those skilled in the art and is not discussed in detail here.

Figure 20:
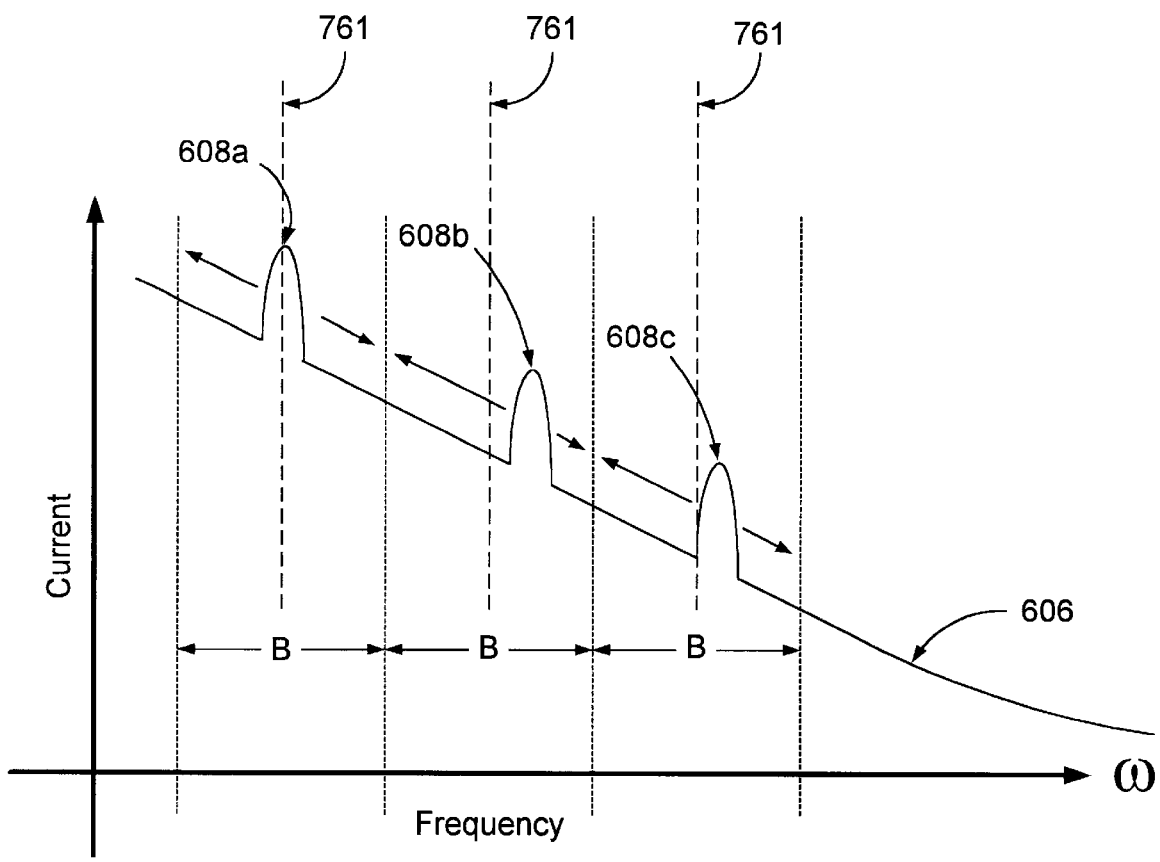
FIG. 20 is a graphical plot of the current generated by a frequency scan of the multiple sensors of FIG. 19.

Turning then, to FIG. 20, shown is a plot of the frequency spectrum of the magnitude of the current of the excitation signal 606 through the transmitting antenna 602 (FIG. 19). The frequency spectrum is partitioned, by way of example, into three specific frequency bands B. The excitation signal 606 shows three peaks 606*a*–606*c*, each peak corresponding to a single sensor 608*a*–608*c* (FIG. 19), although there is not a peak for the multiple sensor 608*d* (FIG. 19), the peaks being for illustration purposes. Within each frequency band B is a center frequency 761. The resonant circuits of the sensors 608 are advantageously designed so that the center frequency 761 is at the center of the range of frequencies within which the resonant circuits operate. This arrangement allows each sensor to relay information relating to a physical condition in the same environment without interference with each other. Consequently, values obtained for a physical parameter such as pressure or temperature may be averaged to obtain greater accuracy etc. Also, several different physical characteristics may be measured at the same time, or spatial resolution of physical characteristics may be determined.

Many variations and modifications may be made to the preferred embodiment of the invention without departing substantially from the spirit and principles of the invention. All such modifications and variations are intended to be included herein within the scope of the present invention, as defined by the following claims.

What is claimed is:

1. A sensor for wirelessly determining physical properties of a medium, comprising:

a self-contained resonant circuit comprising a capacitor, a resistor, and an inductor;

the resistor being variable in response to the temperature of the medium the capacitor being variable in response to pressure of the medium; and, the inductor being adapted to allow inducement of a current in the resonant circuit when the sensor is subjected to a time-varying electromagnetic field.

2. A sensor for wirelessly determining physical properties of a medium, comprising:

a first layer on which is disposed a first plate and an inductor coil;

a second layer having a hole;

a third layer on which is disposed a second plate, the first plate facing the second plate through the hole in the second layer, the first and second plates forming a capacitor, the inductor coil being electrically coupled between the first plate and the second plate; and, the capacitor and the inductor forming a self-contained resonant circuit, the capacitor being variable in response to pressure of the medium, and, the inductor being adapted to allow inducement of a current in the resonant circuit when the sensor is subjected to a time-varying electromagnetic field.

3. A sensor for wirelessly determining physical properties of a medium, comprising:

a first end layer having a first plate;

at least one middle layer having a hole and a conductive loop surrounding the hole, the conductive loops being electrically coupled thereby forming an inductive coil;

a second end layer having a second plate, the first and second plates facing each other through the hole in said at least one middle layer forming a capacitor, the first and second plates being electrically coupled at opposite ends of the inductor coil; and the capacitor and the inductive coil forming a self-contained resonant circuit, the capacitor being variable in response to pressure of the medium, and, the inductor being adapted to allow inducement of a current in the resonant circuit when the sensor is subjected to a time-varying electromagnetic field.

4. A sensor for wirelessly determining physical properties of a medium, comprising:

a self-contained resonant circuit comprising a capacitor, an inductor, and a resistor;

the resistor being variable in response to the presence of a chemical species in a medium; and the inductor being adapted to allow the inducement of a current in the resonant circuit from a transmitted electromagnetic field.

5. A sensor for wirelessly determining physical properties of a medium, comprising:

a self-contained resonant circuit comprising a capacitor, an inductor, and a resistor;

the resistor being variable in response to the temperature of the medium, wherein a bandwidth of the resonant circuit varies with the resistance of the resistor; and the inductor being adapted to allow the inducement of a current in the resonant circuit when the sensor is subjected to a time-varying electromagnetic field.

6. A sensor having a resonant circuit for wirelessly determining physical properties of a medium, comprising:

means for providing a capacitance in the resonant circuit which is variable in response to the ambient pressure of the medium;

means for providing an inductance in the resonant circuit;

means for providing a resistance in the resonant circuit;

means for providing a resistance in the resonant circuit which is variable in response to the temperature of the medium; and means for inducing a current in the resonant circuit when the sensor is subjected to a time-varying electromagnetic field.

7. A sensor having a resonant circuit for wirelessly determining physical properties of a medium, comprising:

means for providing a capacitance in the resonant circuit;

means for providing an inductance in the resonant circuit;

means for providing a resistance in the resonant circuit, the resistance being variable in response to the temperature of the medium, wherein a bandwidth of the resonant circuit varies with the resistance; and means for inducing a current in the resonant circuit when the sensor is subjected to a time-varying electromagnetic field.

8. A system for sensing physical properties of a medium, comprising:

a transmitter adapted to transmit an excitation signal;

a sensor adapted to be placed in the medium, the sensor having a resonant circuit which is capable of being electromagnetically coupled to the transmitter, the resonant circuit having a natural frequency which varies with an ambient pressure of the medium and a bandwidth which varies in response to a temperature of the medium;

a receiver adapted to receive a modified excitation signal which results from the electromagnetic coupling of the resonant circuit to the transmitter; and a logical circuit electrically coupled to the receiver, the logical circuit being adapted to determine the ambient pressure of the medium based on the natural frequency of the resonant circuit manifested in the modified excitation signal, and the logical circuit being adapted to determine the temperature of the medium based upon a bandwidth of the resonant circuit manifested in the modified excitation signal.

9. The system of claim 8, wherein the resonant circuit further comprises a resistance which varies in response to the temperature of the medium, thereby altering the bandwidth of the resonant circuit.

10. The system of claim 8, further comprising:

the resonant circuit having an inductance, a capacitance which varies in response to the ambient pressure of the medium, thereby altering the natural frequency of the resonant circuit, and a resistance disposed in the resonant circuit which varies in response to the temperature of the medium, thereby altering a bandwidth of the resonant circuit.

11. A system for sensing physical properties of a medium, comprising:

means for transmitting an excitation signal;

a sensor adapted to be placed in the medium, the sensor having a resonant circuit which is capable of being electromagnetically coupled to the transmitter, the resonant circuit having a natural frequency which varies with an ambient pressure of the medium, and a bandwidth which varies in response to the temperature of the medium;

means for receiving a modified excitation signal which results from the electromagnetic coupling of the resonant circuit to the transmitter; and means for determining the ambient pressure of the medium based on the natural frequency of the resonant circuit, the resonant frequency being determined from the modified excitation signal; and means for determining the temperature of the medium based upon the bandwidth of the resonant circuit, the bandwidth being determined from the modified excitation signal.

12. The system of claim 11, wherein the resonant circuit further comprises a resistance which varies in response to the temperature of the medium, thereby altering the bandwidth of the resonant circuit.

13. A system for sensing physical properties of a medium, comprising:

means for transmitting an excitation signal;

a sensor adapted to be placed in the medium, the sensor having a resonant circuit which is capable of being electromagnetically coupled to the transmitter, the resonant circuit having a natural frequency which varies with an ambient pressure of the medium, and a bandwidth which varies with a temperature of the medium;

means for receiving a modified excitation signal which results from the electromagnetic coupling of the resonant circuit to the transmitter; and means for determining the ambient pressure of the medium based on the natural frequency of the resonant circuit, the resonant frequency being determined from the modified excitation signal;

means for determining the temperature of the medium based upon the bandwidth of the resonant circuit, the bandwidth being determined from the modified excitation signal;

the resonant circuit further comprising a predetermined inductance;

a capacitance which varies in response to the ambient pressure of the medium, thereby altering the natural frequency of the resonant circuit; and a resistance disposed in the resonant circuit which varies in response to the temperature of the medium, thereby altering the bandwidth of the resonant circuit.

14. A method for sensing physical properties of a medium, comprising the steps of:

transmitting an excitation signal;

inducing a current in a coil inductor of a resonant circuit with the transmitted excitation signal;

resonating the current at the natural frequency of the resonant circuit;

varying the natural frequency of the resonant circuit with a pressure of the medium in which the resonant circuit is placed;

varying a bandwidth of the resonant circuit in response to a temperature of the medium;

receiving a modified excitation signal which results from the inducement of the current in the coil inductor;

determining the pressure of the medium from the natural frequency of the resonant circuit; and determining the temperature of the medium based upon the bandwidth of the resonant circuit.

15. The method of claim 14, wherein the step of varying a bandwidth of the resonant circuit in response to the temperature of the medium further comprises the step of varying a resistance disposed in the resonant circuit in response to the temperature of the medium.

16. The method of claim 15, further comprising the step of determining the temperature of the medium based upon the bandwidth of the resonant circuit.

17. A method for sensing physical properties of a medium, comprising the steps of:

transmitting an excitation signal;

inducing a current in a coil inductor of a resonant circuit with the transmitted excitation signal;

resonating the current at the natural frequency of the resonant circuit;

varying a resistance in the resonant circuit in response to a temperature of the medium in which the resonant circuit is placed, thereby proportionally varying a bandwidth of the resonant circuit;

receiving a modified excitation signal which results from the inducement of the current in the coil inductor; and determining the temperature of the medium from the bandwidth of the resonant circuit.

18. A system for sensing physical properties of a medium, comprising:

a transmitting antenna configured to transmit a time-varying electromagnetic field into the medium;

an impedance analyzer coupled to the transmitting antenna, the impedance analyzer determining an impedance of the transmitting antenna over a predetermined range of frequencies;

a sensor adapted to be placed in the medium, the sensor having a resonant circuit which is capable of being electromagnetically coupled to the transmitting antenna, the resonant circuit having a bandwidth which varies with the presence of a chemical element in the medium; and a logical circuit electrically coupled to the impedance analyzer, the logical circuit being adapted to determine the presence of the chemical element in the medium based on the bandwidth of the resonant circuit as determined by the impedance analyzer.

19. A system for sensing physical properties of a medium, comprising:

a transmitting means for transmitting a time-varying electromagnetic field into the medium;

an analyzer means for determining an impedance of the transmitting means over a predetermined range of frequencies, the analyzer means being coupled to the transmitting means;

a sensor adapted to be placed in the medium, the sensor having a resonant circuit which is capable of being electromagnetically coupled to the transmitting means, the resonant circuit having a bandwidth which varies with the presence of a chemical element in the medium; and means for determining the presence of a chemical element in the medium based on the bandwidth of the resonant circuit as determined by the analyzer means.

* * * * *

UNITED STATES PATENT AND TRADEMARK OFFICE
CERTIFICATE OF CORRECTION

PATENT NO. : 6,111,520
DATED : August 29, 2000
INVENTOR(S) : Allen et al.

It is certified that error appears in the above-identified patent and that said Letters Patent is hereby corrected as shown below:

Col. 16, line 58, delete "and," and replace with -- and --.

Col. 17, line 8, delete "and," and replace with -- and --.

Signed and Sealed this

Twenty-ninth Day of May, 2001

*Attest:*

NICHOLAS P. GODICI

*Attesting Officer*        *Acting Director of the United States Patent and Trademark Office*